(12) United States Patent
Ume et al.

(10) Patent No.: US 12,541,818 B2
(45) Date of Patent: Feb. 3, 2026

(54) MODIFYING SOURCE DATA TO GENERATE HYPERREAL SYNTHETIC CONTENT

(71) Applicant: Metaphysic Limited, London (GB)

(72) Inventors: Chris Ume, Bangkok (TH); Jo Plaete, London (GB); Martin Adams, Cheltenham (GB); Thomas Graham, London (GB)

(73) Assignee: Metaphysic Limited, London (GB)

( * ) Notice: Subject to any disclaimer, the term of this patent is extended or adjusted under 35 U.S.C. 154(b) by 288 days.

(21) Appl. No.: 18/353,608

(22) Filed: Jul. 17, 2023

(65) Prior Publication Data

US 2025/0029208 A1 Jan. 23, 2025

(51) Int. Cl.
*G06T 5/20* (2006.01)
*G06T 5/00* (2024.01)
*G06T 11/00* (2006.01)

(52) U.S. Cl.
CPC ............... *G06T 5/20* (2013.01); *G06T 5/00* (2013.01); *G06T 11/00* (2013.01); *G06T 2207/20081* (2013.01); *G06T 2207/30201* (2013.01)

(58) Field of Classification Search
CPC ... G06T 5/20; G06T 5/00; G06T 11/00; G06T 2207/20081; G06T 2207/30201; G06T 2207/20084; G06T 11/60; G06T 19/20; G06T 2207/10024; G06T 11/001; G06T 15/04; G06T 17/20; G06T 2200/24; G06T 2207/10016; G06T 2219/2021; G06T 3/40; G06T 2207/20092; G06T 2207/20221; G06T 3/18; G06T 7/11; G06T 7/73; G06T 13/40; G06T 2219/2004; G06T 3/4046; G06V 10/82; G06V 40/161; G06V 10/774;
(Continued)

(56) References Cited

U.S. PATENT DOCUMENTS 10,552,977 B1 * 2/2020 Theis .................. G06T 7/70
11,222,466 B1 * 1/2022 Naruniec ............. G06N 3/088
(Continued)

OTHER PUBLICATIONS

"Face Swapping Neural Networks Based on Improved Autoencoders"; Wei-Jong Yang, 2019 IEEE 5th International Conference on Big Data Intelligence and Computing (DATACOM) (2019, pp. 107-112) (Year: 2019).*
(Continued)

*Primary Examiner* — Michael S Osinski
(74) *Attorney, Agent, or Firm* — Lee & Hayes, P.C.

(57) ABSTRACT

Modifying source data to generate hyperreal synthetic content is described. Source data representing images of a body part of a subject may be modified to obtain training data, such as by modifying the body part in the images and/or by enhancing the images to improve the quality thereof. One or more machine learning models may be trained using the training data to obtain one or more trained machine learning models, and the trained model(s) is used to generate output data representing a synthetic body part based at least in part on input data representing an image featuring the body part of the subject, such as an image featuring the modified body part and/or an enhanced image featuring the body part. The output data is then used to generate media data corresponding to media content featuring the synthetic body part.

15 Claims, 8 Drawing Sheets

(58) Field of Classification Search
CPC .. G06V 40/171; G06V 40/172; G06V 40/168; G06V 10/764; G06V 40/10; G06N 3/045; G06N 3/08; G06N 3/088
See application file for complete search history.

(56) References Cited

U.S. PATENT DOCUMENTS

| | | | | |
|---|---|---|---|---|
| 11,699,464 | B2* | 7/2023 | Mann | G06V 40/161 |
| | | | | 386/278 |
| 12,033,374 | B2* | 7/2024 | Wang | G06V 10/82 |
| 12,277,738 | B2* | 4/2025 | Ghebremusse | G06T 9/002 |
| 12,288,277 | B2* | 4/2025 | Ling | G06V 10/774 |
| 12,299,896 | B1* | 5/2025 | Feng | G06T 11/00 |
| 12,374,009 | B2* | 7/2025 | Weber | G06V 10/82 |
| 12,412,089 | B2* | 9/2025 | Kalarot | G06N 3/045 |
| 2013/0251244 | A1* | 9/2013 | Wei | G06V 40/171 |
| | | | | 382/159 |
| 2020/0210709 | A1* | 7/2020 | Pavetic | G06V 20/41 |
| 2020/0334867 | A1 | 10/2020 | Chen et al. | |
| 2020/0358983 | A1* | 11/2020 | Astarabadi | H04N 7/157 |
| 2021/0279515 | A1* | 9/2021 | Zhang | G06F 18/214 |
| 2021/0343063 | A1* | 11/2021 | Garbin | G06F 18/22 |
| 2021/0375020 | A1 | 12/2021 | Zhang et al. | |
| 2022/0058377 | A1* | 2/2022 | Baek | G06T 9/002 |
| 2022/0108422 | A1* | 4/2022 | Choi | G06T 17/20 |
| 2022/0374649 | A1* | 11/2022 | Naruniec | G06V 10/774 |
| 2023/0042734 | A1* | 2/2023 | Cao | G06V 20/70 |
| 2023/0066716 | A1 | 3/2023 | Zhang | |
| 2023/0085605 | A1* | 3/2023 | Zhang | G06T 7/90 |
| | | | | 345/589 |
| 2023/0132243 | A1* | 4/2023 | Mann | G06N 3/084 |
| | | | | 386/278 |
| 2023/0215216 | A1 | 7/2023 | Lee et al. | |
| 2023/0306685 | A1* | 9/2023 | Qiu | A63F 13/655 |
| 2023/0326005 | A1* | 10/2023 | Beggel | G06T 7/194 |
| | | | | 382/141 |
| 2024/0193822 | A1* | 6/2024 | Chen | G06T 3/40 |
| 2024/0212249 | A1 | 6/2024 | Ume et al. | |
| 2024/0312086 | A1* | 9/2024 | Goshen | A61B 6/5247 |
| 2024/0386289 | A1* | 11/2024 | Zheng | G06N 5/02 |
| 2024/0404128 | A1* | 12/2024 | Shah | G06T 7/11 |
| 2024/0420286 | A1* | 12/2024 | Kenny | G06T 5/50 |
| 2025/0209707 | A1* | 6/2025 | Pan | G06T 15/04 |

OTHER PUBLICATIONS

Kim, et al., "DCFace: Synthetic Face Generation with Dual Condition Diffusion Model", retrieved on Sep. 10, 2024 at <<https://arxiv.org/abs1710.04724>>, Michigan State University, Apr. 14, 2023, pp. 1-18.

Search Report and Written Opinion for International Application No. PCT/US24/38296, Dated Oct. 2, 2024, 8 pages.

* cited by examiner

MODIFYING SOURCE DATA TO GENERATE HYPERREAL SYNTHETIC CONTENT

BACKGROUND

Hyperreal synthetic content is a key component to the ongoing development of the metaverse. "Synthetic," in this context, means content created using artificial intelligence (AI) tools. For example, generative adversarial networks (GANs) can generate synthetic faces based on training data. Synthetic content is "hyperreal" when the synthetic content is so realistic that a human can't tell if it was recorded in real life or created using AI tools.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
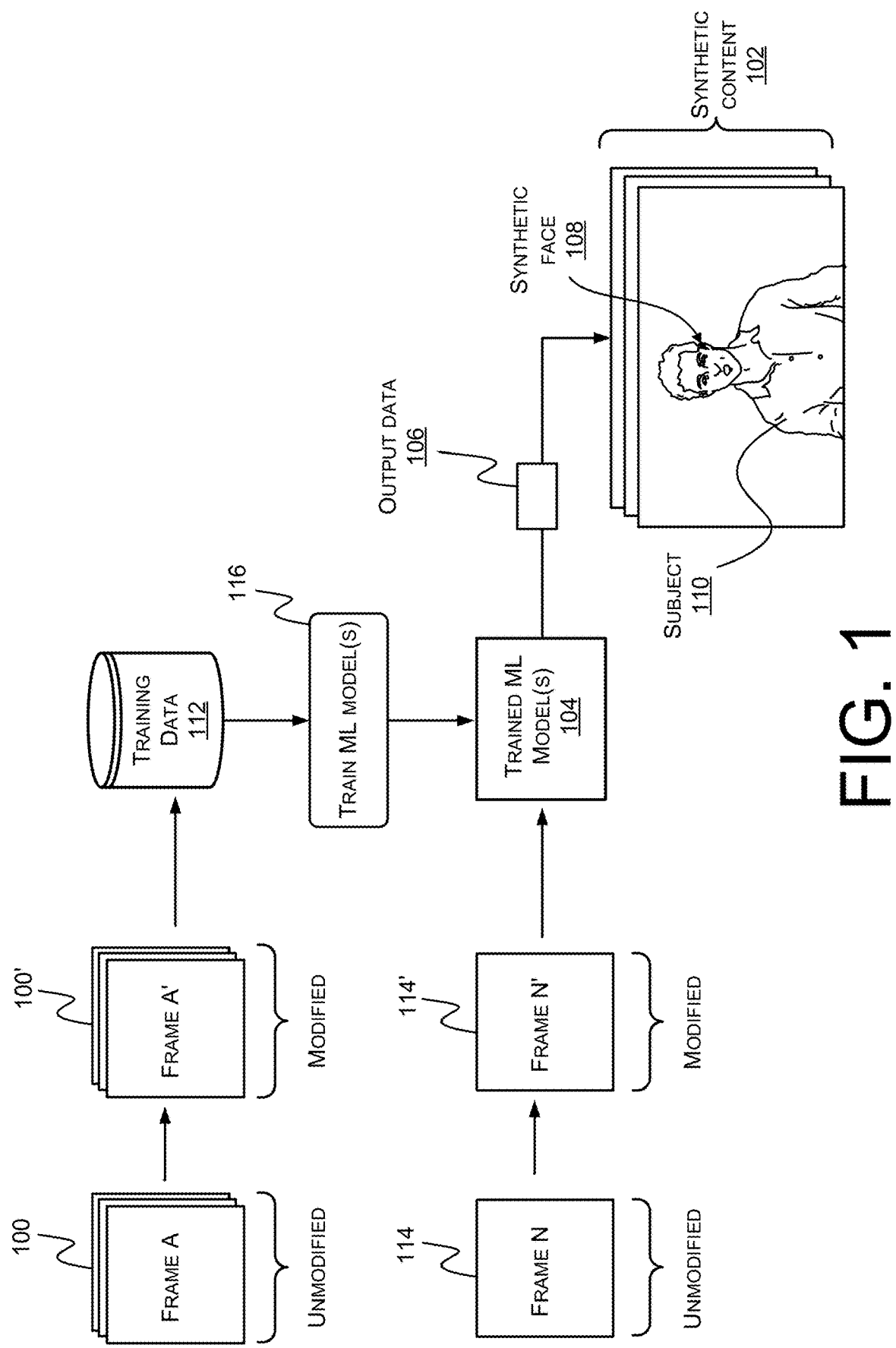
FIG. 1 is a diagram illustrating an example technique for modifying source data to generate hyperreal synthetic content.

Synthetic faces generated using existing technologies are often unnatural-looking. This can occur, for example, when a source face that is to be swapped with a synthetic target face is incompatible with the target face. For example, if the source face represents the face of a first person who looks very different from a second person with the target face (i.e., if the first person and the second person are different people who do not look alike), when AI tools are used to swap the source face with a synthetic version of the target face, the synthetic target face can end up looking unnatural, or fake, to a viewing user. That is, from the perspective of the viewing user, there may be something "off" about the appearance of the synthetic target face, such as cheekbones that are unnaturally proportioned, or eyes that are spaced, shaped, and/or angled in a way that looks unnatural. This leads the viewing user to immediately recognize the image as a fake. To mitigate this issue, entities that create synthetic content by swapping a source face with a synthetic target face have attempted to hire a lookalike stand-in actor for the source face (i.e., someone with a face that looks very similar to the target face). However, it can be quite difficult and/or expensive to find such a stand-in actor with a face that looks very similar to the desired target face. Furthermore, attempts to digitally modify the synthetic target face after it has already been generated using AI tools have been largely unsuccessful to date in that such ex post facto modifications of the target face typically result in an unnatural-looking synthetic face (i.e., these types of ex post facto modifications don't work very well). Another reason that synthetic content can look fake to a viewing user is because the source data is of low quality by today's standards. For example, if original footage of a now deceased actor who starred in a movie from the 1970s is used as the source data in a face-swapping context, the synthetic content generated using this low-quality footage may look fake to a viewing user. In view of the above, the "hyperreal" bar has not been met by existing technologies, and even if hyperreal synthetic content has been created on occasion, such hyperreal synthetic content is not reproduceable at scale.

Described herein are, among other things, techniques, devices, and systems for modifying source data to generate hyperreal synthetic content (sometimes referred to herein as "photoreal generative" content). In some examples, the source data may represent images (e.g., video data comprised of a series of frames) of a face (or other body part) of a first subject (e.g., person), and media content is generated featuring a hyperreal synthetic face (or other body part) of a second subject (e.g., person) who is a different subject than the first subject, and who looks different than the first subject. In accordance with the techniques described herein, the source data can be modified in order to increase the likelihood that a machine learning model(s) will generate synthetic content that is hyperreal (e.g., a hyperreal synthetic face of the second subject, in the above example). In other words, the disclosed source data modification techniques allow a machine learning model(s) to generate a synthetic face of a subject that is, from the perspective of a viewing user, indiscernible from the actual, real life subject, thereby making the synthetic face hyperreal when it is featured in media content.

To illustrate, one or more machine learning models may be trained to generate synthetic content (e.g., a synthetic face, or other body part) with a degree of adaptation by virtue of training the machine learning model(s), at least in part, with modified source data. In some examples, a face of a first subject in the source data is to be used as the input for driving the generation of a synthetic target face in the resulting hyperreal synthetic content. In accordance with the techniques described herein, modification of the source data can include adjusting a size and/or a shape of the face of the first subject in the source data, and/or adjusting the size, shape, position, orientation, and/or spacing of one or more facial features (e.g., eyes, nose, mouth, ears, cheekbones, etc.) in the source data. These types of modifications are sometimes referred to herein as "warping" the face in the source data with the objective of modifying the source face in one or more ways to substantially match the target face of a second, different subject who is to be featured in the resulting media content. Accordingly, the source data may be modified in one or more ways to obtain training data representing images of the first subject with a modified face (e.g., a modified face that substantially matches the face of the second subject in terms of size, shape, position, orientation, and/or spacing of facial features and/or the face itself). This training data can then be used to train the machine learning model(s) to generate a hyperreal synthetic face of the second subject when the model(s) receives input data representing an image featuring the modified face of the first subject.

The synthetic face of the second subject can be featured in media content to create hyperreal synthetic content. In an illustrative example, the first subject may be a stand-in actor (e.g., stunt double), and the second subject may be a famous actor whose face images are ubiquitous (e.g., readily available on the Internet), which allows for training the machine learning model(s) to swap the face of the stand-in actor (i.e., the source face) with a synthetic face of the famous actor (i.e., the target face). In this example, the media content generated using the techniques, devices, and systems described herein may feature a synthetic face of the famous actor, and because the machine learning model(s) was trained using modified source data (e.g., images of the first subject with a modified (e.g., warped) face), when the model(s) receives input data representing an image featuring the modified face of the first subject, the trained machine learning model(s) generates output data representing a hyperreal synthetic face of the second subject. In other words, the synthetic face of the second subject featured in the media content may be indiscernible from the actual, real life second subject, thereby making the synthetic face in the media content hyperreal.

In some examples, the source data may represent images (e.g., video data comprised of a series of frames) of relatively low quality by today's standards, and the images in the source data may feature a face (or other body part) of a subject (e.g., person). For example, the source data may correspond to footage of an old movie (e.g., a movie filmed in the mid-20$^{th}$ century) starring a famous actor who is now deceased. Such footage is typically of low resolution, among other things. For example, footage recorded with 35 millimeter (mm) film—a common film gauge used in filmmaking before the advent of digital cinematography—has a resolution of roughly 5600×3620 pixels, which is low quality by today's standards. Even some digital video (e.g., video footage that was recorded decades ago) is of relatively low quality by today's standards due to the inferior camera technology used to record such video footage, as compared to the state-of-the-art cameras in use today, let alone to future camera technology that will be used years from now. Moreover, due to the lenses used in legacy video cameras, old footage is often softer (e.g., blemishes, pores, and other imperfections on a person's skin are less noticeable in older footage). It is also common for old footage to be less colorful than today's video content filmed with the latest image sensor and image processing technologies that are configured to record and output a larger dynamic range of colors. In accordance with the techniques described herein, the above-mentioned source data can be modified to enhance the quality of the images in the source data. This enhancement of the images in the source data allows a machine learning model(s) to generate hyperreal synthetic content that looks so realistic that a human can't tell that it was generated using AI tools. This is due, in part, to providing the machine learning model(s) with more pixels and/or "better" pixels to train from.

To illustrate, one or more machine learning models may be trained to generate synthetic content (e.g., a synthetic face, or other body part) with a degree of adaptation by virtue of training the machine learning model(s), at least in part, with modified source data, which, in this latter example, can represent images that are modified from a first quality to a second quality greater than the first quality. In some examples, the modification of this source data can include increasing a resolution, a sharpness, and/or any other quality metric associated with the images in the source data. This is sometimes referred to herein as "enhancing" the images in the source data. Accordingly, the source data—which represents images of a first quality—may be modified to obtain training data representing the images of a second quality greater than the first quality, and this training data can then be used to train the machine learning model(s) to generate hyperreal synthetic content when the model(s) receives input data representing an image of the second quality. In some examples, the hyperreal synthetic content may feature a hyperreal synthetic face (or other body part), such as the face (or other body part) of the subject (e.g., person) featured in the source data. In an illustrative example, an image of the second quality provided as input to the trained machine learning model(s) may be an enhanced still frame of a movie that was filmed in, say, the 1960s featuring a face of a famous actor who is now deceased, and the trained machine learning model(s) may generate output data representing a synthetic face of this famous actor (e.g., saying something they didn't say in the original footage) or a synthetic face of a different subject (e.g., a different famous actor). In this example, the media content generated using the techniques, devices, and systems described herein may feature a synthetic face (e.g., of the famous actor in the original footage), and because the machine learning model(s) was trained using modified source data (e.g., enhanced images), when the model(s) receives input data representing an enhanced image featuring the face of the famous actor, the trained machine learning model(s) generates output data representing a hyperreal synthetic face, which can allow for posthumously resurrecting the actor or featuring a different subject in new media content based on the original, low-quality footage. For instance, a synthetic face of the now deceased actor can be featured in media content in such a way that, to a viewing user, the synthetic content featuring this synthetic likeness of the actor is so realistic that the viewing user can't tell that it was generated using AI tools, thereby making the synthetic content (e.g., the synthetic face) hyperreal.

It is to be appreciated that synthetic faces generated using the techniques described herein can be featured in any suitable type of media content, such as image content, video content, or the like. For example, instances of a synthetic target face may be overlaid on a source face of a subject within frames of source video content to generate video data corresponding to video content featuring the synthetic target face. Regardless of the type of media content, this synthetic content may then be displayed in any suitable environment and/or on any suitable device with a display, such as on a display of a user computing device, in the context of a metaverse environment, or in any other suitable manner.

The techniques and systems described herein can be used in various applications. One example application is lip-syncing. For example, the synthetic content may feature a synthetic face of a subject exhibiting mouth movements (e.g., saying something) to match a mouth-generated sound (e.g., spoken utterance). In this manner, the techniques and systems described herein can be used in lip-syncing applications to make it appear, in the synthetic content (e.g., video content), that the subject is saying something he/she did not actually say. In some cases, the subject featured in the synthetic content may be deceased, and, in this particular context, the subject can be posthumously resurrected in new synthetic content using the techniques and systems described herein. For example, a famous actor who is now deceased can be "brought back from the dead," and/or a consumer can upload a digital copy of a photograph of a deceased relative (e.g., grandparent), a younger version of themselves or another person, etc., and the hyperreal synthetic likeness can be experienced in a metaverse context, for example, even though there may not be any high-fidelity imagery of the likeness that is available for use in creating synthetic content of the likeness. Another example application is language translation. For example, the synthetic content may feature a synthetic face of a subject exhibiting mouth movements that match a spoken utterance in a particular language. In this manner, the techniques and systems described herein can be used in language translation applications to make it appear, in the synthetic content (e.g., video content), that the subject is saying something in a particular language, even if the real-life subject is not actually fluent in that particular language.

The techniques and systems described herein may provide an improved experience for consumers of synthetic content, such as participants of the metaverse. This is at least because, as compared to synthetic faces generated using existing technologies, the techniques and systems described herein allow for generating synthetic content (e.g., a synthetic face) that is hyperreal by virtue of the source data modification techniques described herein, which involves altering source data early in the end-to-end synthetic-content-creation process to allow one or more AI models to train with modified source data and learn how to generate synthetic content (e.g., synthetic faces) that looks more realistic and natural to a viewing user. Accordingly, the techniques and system described herein provide an improvement to computer-related technology. That is, technology for generating synthetic faces using AI tools is improved by the techniques and systems described herein by virtue of generating synthetic content (e.g., synthetic faces, or other body parts) of higher quality (e.g., synthetic content that is more realistic), as compared to the synthetic content generated with existing technologies, and doing so at scale (e.g., in a way that is reproduceable/repeatable). In other words, the source data modification techniques described herein provide a scalable way to generate synthetic content (e.g., synthetic faces, or other body parts) that is more realistic and/or natural-looking than without the use of the disclosed source data modification techniques.

Existing approaches for improving the output of a machine learning model that is trained to generate a synthetic face are limited. For example, as mentioned above, attempts have been made to hire a lookalike stand-in actor for a source face (i.e., someone with a face that looks very similar to the desired target face). However, such ad hoc methods are often too difficult, time-consuming, and/or expensive to allow for reproducing hyperreal synthetic content (e.g., synthetic faces) at scale with repeatability. Moreover, a digital, two-dimensional (2D) modification of a synthetic target face ex post facto (i.e., after it has been generated using AI tools that were trained exclusively on unmodified/original source data) often results in a cheap, unnatural-looking synthetic face. The techniques and systems described herein address these drawbacks by using source data modification techniques for training AI model(s) to generate synthetic content (e.g., synthetic faces). In this manner, the AI model(s) learn, from the modified source data, how to "deal with" the modified source data (e.g., images of warped faces, enhanced images of faces, etc.), and this learning becomes embedded into the AI-based generation of the synthetic content (e.g., synthetic faces), resulting in hyperreal synthetic content that looks so realistic that a viewing user can't tell that it was generated using AI tools. Furthermore, the end-to-end synthetic-content-creation process is quicker, more streamlined, and/or more efficient in the sense that a synthetic content creator does not have to locate and hire a perfect lookalike source performer to achieve synthetic content that is hyperreal.

In addition, the techniques and systems described herein may further allow one or more devices to conserve resources with respect to processing resources, memory resources, networking resources, etc., in the various ways described herein. For example, the techniques and systems described herein allow for creating hyperreal synthetic content without having to perform significant post-processing operations on AI-generated synthetic content in an attempt to correct the "mistakes" made by the AI model(s) in hopes of making the synthetic content look more realistic. Instead, resources can be conserved through the streamlined techniques described herein to more efficiently train AI models to generate hyperreal synthetic content. These technical benefits are described in further detail below with reference to the figures.

Although many of the examples described herein pertain to generating synthetic faces of people, the techniques, device, and systems described herein can be implemented to generate synthetic versions of any suitable body part (e.g., body parts other than a face, such as a neck, an arm, a hand, a leg, a foot, etc.). In this sense, the techniques, devices, and systems described herein may be implemented to create media content featuring a synthetic likeness of any kind; "likeness" being a representation of any suitable part of a subject (e.g., a person). Additionally, or alternatively, the techniques, devices, and systems described herein can be implemented to generate synthetic faces (or other body parts) of any suitable type of subject besides a person/human, such as an animal (e.g., a monkey, a gorilla, etc.), an anthropomorphic robot, an avatar, other digital characters, and the like.

FIG. 1 is a diagram illustrating an example technique for modifying source data 100 to generate hyperreal synthetic content 102. In FIG. 1, the source data 100 may be, or include, image data corresponding to image content. In some examples, the source data 100 may be, or include, video data (e.g., a series of frames or images) corresponding to video content. Accordingly, the source data 100 may be an image dataset representing a plurality of images associated with any suitable type of media content. In some examples, the source data 100 represents images of a subject (not shown in FIG. 1). For example, the source data 100 may represent images of a face (or other body part) of a first subject (e.g., person). In an illustrative example, the first subject featured in the images of the source data 100 may be a stand-in actor (e.g., stunt double).

FIG. 1 further depicts one or more trained machine learning models 104 that are trained to generate output data 106, which is used to create the hyperreal synthetic content 102. An example objective of the techniques and systems described herein may be to use the output data 106 generated by the trained machine learning model(s) 104 to create synthetic content 102 that features a hyperreal synthetic face 108 (or other body part) of a subject 110 (e.g., person). In some examples, the subject 110 featured in the synthetic content 102 is a different subject than the subject (e.g., person) featured in the images of the source data 100.

Furthermore, the subject 110 featured in the synthetic content 102 may look different than the subject featured in the images of the source data 100.

Machine learning generally involves processing a set of examples (called "training data" 112 or a "training dataset" 112) in order to train a machine learning model(s) 104 (sometimes referred to herein as an "AI model(s)"). A machine learning model(s) 104, once trained, is a learned mechanism that can receive new data as input and estimate or predict a result as output. In particular, the trained machine learning model(s) 104 used herein may be configured to generate images; namely, images of synthetic body parts (e.g., the synthetic face 108) that are featured in media content, such as by swapping a face featured in input data 114' with an AI-generated, synthetic face 108. In other words, the machine learning model(s) 104 may learn to swap a face featured in input data 114' with a hyperreal synthetic face 108 of the subject 110. In some examples, a trained machine learning model(s) 104 used to generate synthetic body parts (e.g., the synthetic face 108) may be a neural network(s). In some examples, an autoencoder(s), and/or a generative model(s), such as a generative adversarial network (GAN), is used herein as a trained machine learning model(s) 104 for generating synthetic body parts (e.g., the synthetic face 108). In some examples, the trained machine learning models described herein represents a single model or an ensemble of base-level machine learning models. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

A training dataset 112 that is used to train the machine learning models described herein may include various types of data. In general, training data 112 for machine learning can include two components: features and labels. However, the training dataset 112 used to train the machine learning models described herein may be unlabeled, in some embodiments. Accordingly, the machine learning models described herein may be trainable using any suitable learning technique, such as supervised learning, unsupervised learning, semi-supervised learning, reinforcement learning, and so on. The features of the training data 112 can be represented by a set of features, such as in the form of an n-dimensional feature vector of quantifiable information about an attribute of the training data 112. As part of the training process, weights may be set for machine learning. These weights may apply to a set of features included in the training dataset 112. In some examples, the weights that are set during the training process may apply to parameters that are internal to the machine learning models (e.g., weights for neurons in a hidden-layer of a neural network). The weights can indicate the influence that any given feature or parameter has on the output of the trained machine learning models.

In order to improve the quality of the synthetic faces generated by the trained machine learning model(s) 104 shown in FIG. 1, the machine learning model(s) 104 may be trained (block 116 in FIG. 1) based on training data 112 that includes, at least in part, modified source data 100'. As mentioned above, the source data 100 may represent a plurality of images. Accordingly, the source data 100 can be modified (e.g., digitally modified) in one or more ways to obtain modified source data 100' representing modified images. This source data modification technique may be implemented as one or more preprocessing operations (e.g., as part of an adjustment path) that occur early in an end-to-end synthetic-content-creation process. In an illustrative example, if the unmodified source data 100 represents images of a body part (e.g., a face) of a first subject, the modified source data 100' may represent the images of the first subject with a modified body part (e.g., a modified face). This modified source data 100' may then be included in (e.g., added to) the training dataset 112 and used to train the machine learning model(s) 104 at block 116. In this manner, the machine learning model(s) 104 can be trained to generate synthetic content 102 (e.g., a synthetic face 108, or other body part) with a degree of adaptation by virtue of training the machine learning model(s) 104, at least in part, with the modified source data 100'.

In some examples, modification of the source data 100 to obtain the modified source data 100' can include adjusting a size and/or a shape of the face of the first subject in the source data 100. For example, the source data 100 can be modified to obtain modified source data 100' representing the images of the first subject with a modified face that substantially matches a size and a shape of a face of the second subject 110 who is to be featured in the synthetic content 102. In some examples, modification of the source data 100 to obtain the modified source data 100' can include adjusting the size, shape, position, orientation, and/or spacing of one or more facial features (e.g., eyes, nose, mouth, ears, cheekbones, etc.) in the source data 100 so that the facial features are better-aligned with the facial features of the target face (e.g., the face of the second subject 110). This "warping" of the source face in the source data 100 is one example way of making the source face more compatible with the target face of a second, different subject 110 who is to be featured in the resulting synthetic content 102. By including the modified source data 100' in the training dataset 112, at least some of the training data 112 that is used to train the machine learning model(s) 104 can represent, for example, images of the first subject with a modified face (e.g., a modified face that substantially matches the face of the second subject 110 in terms of size, shape, position, orientation, and/or spacing of facial features and/or the face itself). "Substantially matches," in this context, can mean "is the same as" or "is different by no more than a threshold amount." At the very least, and not as an attempt to limit the application of the doctrine of equivalents to the scope of the claims, the term "substantially" has the meaning reasonably ascribed to it by a person of ordinary skill in the art when used in conjunction with a given condition (e.g., matching), parameter value, or range of values, i.e. differing, if at all, by an amount that is no more than ±20% of the parameter value; ±19% of the parameter value; ±18% of the parameter value; ±17% of the parameter value; ±16% of the parameter value; ±15% of the parameter value; ±14% of the parameter value; ±13% of the parameter value; ±12% of the parameter value; ±11% of the parameter value; ±10% of the parameter value; ±9% of the parameter value; ±8% of the parameter value; ±7% of the parameter value; ±6% of the parameter value; ±5% of the parameter value; ±4% of the parameter value; ±3% of the parameter value; ±2% of the parameter value; or ±1% of the parameter value. As an example, if face size is measured as a 2D area, and if the face size parameter value of a target face is X, X being any suitable numerical value expressed in any suitable units of measurement (e.g., centimeters squared, millimeters squared, number of pixels, etc.), a source face substantially matches the target face if the face size parameter value of the source face differs, if at all, from X by an amount that is no more than ±20% of X.

It is to be appreciated that the training data 112 can further include other data, such as an image dataset of the subject 110 featured in the synthetic content 102 (e.g., a face image dataset of the subject 110), an image dataset of the subject featured in the images of the source data 100 (e.g., a face image dataset of a stand-in actor), or the like. As shown in FIG. 1, the training data 112 (including at least the modified source data 100') can then be used to train the machine learning model(s) 104 at block 116 using any of the training techniques described herein and/or known to a person having ordinary skill in the art. In this way, the trained machine learning model(s) 104 is configured to generate a hyperreal synthetic face 108 of the second subject 110.

For example, once trained, the model(s) 104 may receive input data 114', as shown in FIG. 1. In the example of FIG. 1, the input data 114' may represent an image(s) that has been modified in one or more ways. For example, unmodified data 114 may represent an image of a body part (e.g., a face) of the first subject featured in the images of the source data 100, the image having never been "seen" before by the trained machine learning model(s) 104. In an illustrative example, the first subject featured in the image(s) may be a stand-in actor (e.g., stunt double) who was filmed performing a scene to create the data 114. Accordingly, the unmodified data 114 may represent one image (e.g., a frame) of a series of images (e.g., frames). The image can be modified to obtain the input data 114'. For example, the input data 114' may represent the image of the first subject with a modified body part (e.g., a modified face). When the trained model(s) 104 receives the input data 114' representing an image featuring the modified face of the first subject, the trained model(s) 104 generates output data 106 representing a hyperreal synthetic face 108 of the second subject 110. The output data 106 can be used to generate media data corresponding to media content (e.g., the synthetic content 102) featuring the hyperreal synthetic face 108 of the second subject 110. In an illustrative example, the second subject 110 may be a famous actor whose face images are ubiquitous (e.g., readily available on the Internet), which allows for including an image dataset of the second subject 110 in the training data 112 for purposes of training the model(s) 104 to face swap. This allows the machine learning model(s) 104 to, for instance, swap the face of the stand-in actor (i.e., the source face) with a synthetic face 108 of the famous actor (i.e., the target face). In this example, because the machine learning model(s) 104 was trained using the modified source data 100' (e.g., images of the first subject with a modified (e.g., warped) face), when the model(s) 104 receives the input data 114' representing an image featuring the modified face of the first subject, the trained machine learning model(s) 104 generates output data 106 representing a hyperreal synthetic face 108 of the second subject 110. In other words, the synthetic face 108 of the second subject 110 featured in the media content (e.g., the synthetic content 102) may be indiscernible from the actual, real life second subject 110, thereby making the synthetic face 108 in the media content (e.g., the synthetic content 102) hyperreal.

Modification of the source data 100 and/or modification of the unmodified input data 114, as depicted in FIG. 1, can be performed in various ways. In some examples, the modification is performed manually, such as by an artist performing a "warping pass" on a source performance using image editing software and/or similar tools. In some examples, this warping pass can be performed by an artist(s) on every frame of a source performance, such as every frame of the source data 100 and/or every frame of unmodified input data 114. In some examples, the modification is performed semi-manually (or semi-automated). In a semi-automated implementation, instead of manually modifying every frame of a source performance, machine learning-detected alignments of the source face and the target face may be used to automate driving a face warp by "hooking" modification tools (e.g., splines) onto the face in the source performance so that an artist can modify the face in select frames (e.g., every other frame, every few frames, etc.) throughout the timeline of the source performance. In some examples, the modification is automated (e.g., fully automated). In an automated implementation, a human artist is not involved in the modification. Instead, a processor(s) may compute alignments of the source face and the target face, and from the alignments determine (e.g., calculate) offsets to correlate the relative values between images of the source face and the target face. In some examples, an additional machine learning model learns a 2D displacement mapping (e.g., a heat map with directional information (e.g., pixel A of the source face corresponds to a position (e.g., X1, Y1) on the target face, pixel B of the source face corresponds to a position (e.g., X2, Y2) on the target face, etc.)) in order to output a modified (e.g., warped) source face, which is used to generate the modified source data 100' for training the machine learning model(s) 104 and/or to generate the input data 114' for the trained machine learning model(s) 104. In other words, an additional machine learning model(s) may learn how to modify a source face (e.g., using relative offsets between features (e.g., eyes, nose, mouth, ears, etc.) of the source face and the target face, such as 2D displacement mapping) to create modified source data 100' for inclusion in the training data 112 and/or to modify new data 114 to obtain the input data 114' that is provided as input to the trained machine learning model(s) 104.

Figure 2:
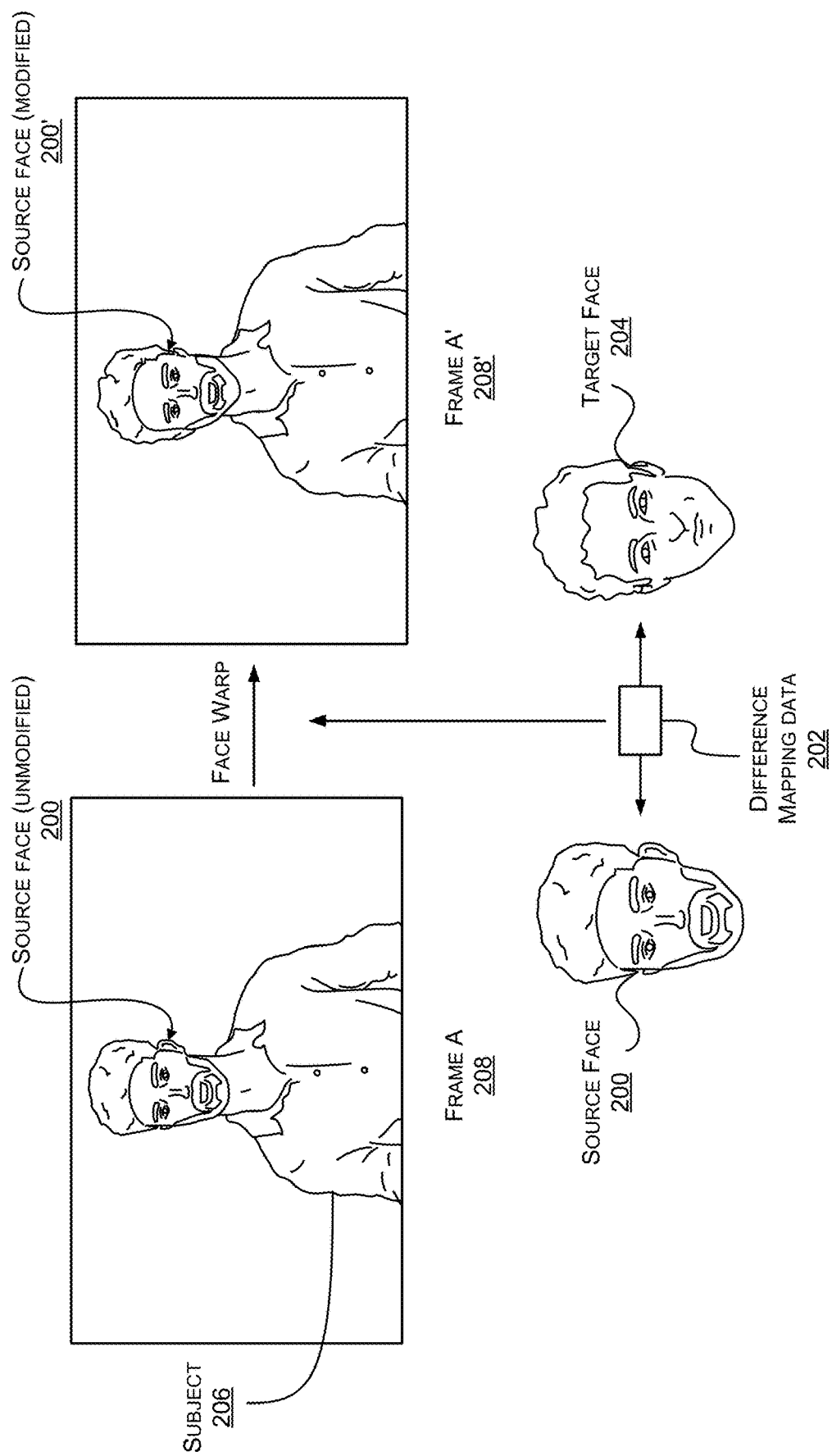
FIG. 2 is a diagram illustrating an example technique for modifying a source face based on difference mapping data between the source face and a target face.

FIG. 2 is a diagram illustrating an example technique for modifying a source face 200 based on difference mapping data 202 between the source face 200 and a target face 204. As mentioned above, source data 100 and/or unmodified input data 114 can be modified (e.g., manually, semi-automatically, or automatically) to obtain modified images, such as images of the first subject with a modified face that substantially matches a size and a shape of a face of the second subject 110 who is to be featured in the synthetic content 102. In the example of FIG. 2, the source face 200 may represent the face of a first subject 206 featured in the source data 100 and/or the unmodified input data 114, and the target face 204 may represent the face of the second subject 110 that is to be featured in the synthetic content 102. In FIG. 2, a frame 208 (e.g., Frame A) represents an image of the first subject 206. In particular, the frame 208 features an unmodified face of the first subject 206 (i.e., the source face 200). Meanwhile, frame 208' (e.g., Frame A') represents the image of the first subject 206, but with a modified face 200'. In general, difference mapping data 202 can be used to modify frame 208 to obtain frame 208' representing the image of the first subject 206 with the modified face 200'. In some examples, the difference mapping data 202 can include one or more offsets between the face of the first subject 206 (i.e., the source face 200) and the face of the second subject 110 (i.e., the target face 204). The offset(s) may be determined (e.g., calculated) based on alignments between the source face 200 and the target face 204, such as alignments of the size and/or shape of the face, and/or alignments of one or more features (e.g., eyes, nose, mouth, ears, cheekbones, etc.). In general, the more that the source face 200 and the target face 204 are misaligned, the greater the offsets will be. In an example, if the eyes of the source face 200 are spaced apart by a first distance and the eyes of the target face 204 are spaced apart by a second distance different than the first distance, the difference mapping data 202 may include an "eye spacing" offset that is equal to the difference between the first distance and the second distance. The eye spacing offset may, therefore, indicate that the eyes of the source face 200 should be moved closer together (or farther apart) by an amount of, say, a half inch to substantially match a spacing between the eyes of the target face 204. This is merely one example of an offset, and other offsets indicated in the difference mapping data 202 may correspond to adjustments of the size, shape, position, orientation, and/or spacing of one or more facial features (e.g., eyes, nose, mouth, ears, cheekbones, etc.) of the source face 200. As another example, the difference mapping data 202 may include an offset(s) that indicates a difference between the respective sizes and/or shapes of the source face 200 and the target face 204. In this manner, the source face 200 can be modified by enlarging, stretching, shrinking, squeezing, and/or changing the shape of the overall face in a height (Y) dimension, a width (X) dimension, or a combination thereof. In some examples, the source face 200 can be modified by rotating and/or moving (e.g., translating) individual facial features from one orientation to another orientation and/or from one position to another position. In some examples, the difference mapping data 202 may include a 2D displacement mapping between the source face 200 and the target face 204. In some examples, the 2D displacement mapping between the source face 200 and the target face 204 is generated using an additional machine learning model(s) (e.g., in the automated implementation noted above). Modifying the source face 200 based on the offset(s) (e.g., 2D displacement mapping) indicated in the difference mapping data 202 causes the modified source face 200' featured in the frame 208' to be more compatible (e.g., better-aligned) with the target face 204 (e.g., the face of the second subject 110), which aids the machine learning model(s) 104 in achieving a hyperreal outcome in the output data 106 that is used to generate the synthetic content 102.

In some examples, a three-dimensional (3D) model(s) of either or both of the source face 200 or the target face 204 may be used to modify (e.g., warp) the source face 200 to obtain the frame 208' featuring the modified source face 200' depicted in FIG. 2. Using a 3D model of either or both of the source face 200 or the target face 204 to modify the source face 200 may be beneficial in instances where the source face 200 in the to-be-modified image (e.g., frame 208) is at a particular orientation other than front-facing. For example, if the source face 200 in the frame 208 is at a side angle that shows a side profile of the face of the subject 206, a 3D model of the source face 200 and/or the target face 204 may facilitate a more accurate modification (e.g., face warp) of the source face 200. In the automated implementation noted above, an additional machine learning model(s) may train with the 3D face model(s) to learn a 3D displacement mapping between the source face 200 and the target face 204. In other words, an additional machine learning model(s) may learn how to modify a source face 200 (e.g., using a 3D displacement mapping, such as X, Y, Z offsets) to create modified source data 100' for inclusion in the training data 112 and/or to modify data 114 to obtain the input data 114' that is provided to the trained machine learning model(s) 104. In some examples, the modification based on a 3D face model(s) involves tracking a 3D mesh in place of the source face 200 in the source performance, animating a 3D model of the target face 204 (e.g., to create facial expressions of the 3D model that mimic the source face 200 in the source performance), and then using the animated 3D model to modify (e.g., warp) the source face 200 across multiple frames of the source data 100 and/or unmodified input data 114. To generate the 3D model(s) of the source face 200 and/or the target face 204, the respective faces of the subjects 206 and 110 may be scanned using a 3D scanner or similar technology.

With reference again to FIG. 1, the source data 100, in some examples, represents images (e.g., video data comprised of a series of frames) of relatively low quality by today's standards. These low-quality images may feature a face (or other body part) of a subject (e.g., person). For example, the source data 100 may correspond to footage of an old movie (e.g., a movie filmed in the mid-20$^{th}$ century) starring a famous actor who is now deceased. In accordance with the techniques described herein, the source data 100 can be modified to enhance the quality of the images in the source data 100 (e.g., to enhance the images of a first quality to obtain images of a second quality greater than the first quality). "Quality," in this context, can be any suitable quality metric associated with images, such as resolution, sharpness, noise, dynamic range, tone reproduction, contrast, color, distortion, vignetting, exposure accuracy, lateral chromatic aberration, lens flare, color moiré, artifacts, etc. In some examples, "quality," in this context, can also, or alternatively, mean, the quality of a body part (e.g., face) depicted in the images, such as quality that is measured in terms of the visibility of the details of the face (e.g., skin pores, blemishes, freckles, wrinkles, hair strands, etc.). This enhancement of the images in the source data 100 allows the machine learning model(s) 104 to generate hyperreal synthetic content 102 that looks so realistic that a human can't tell that it was generated using AI tools.

Figure 3:
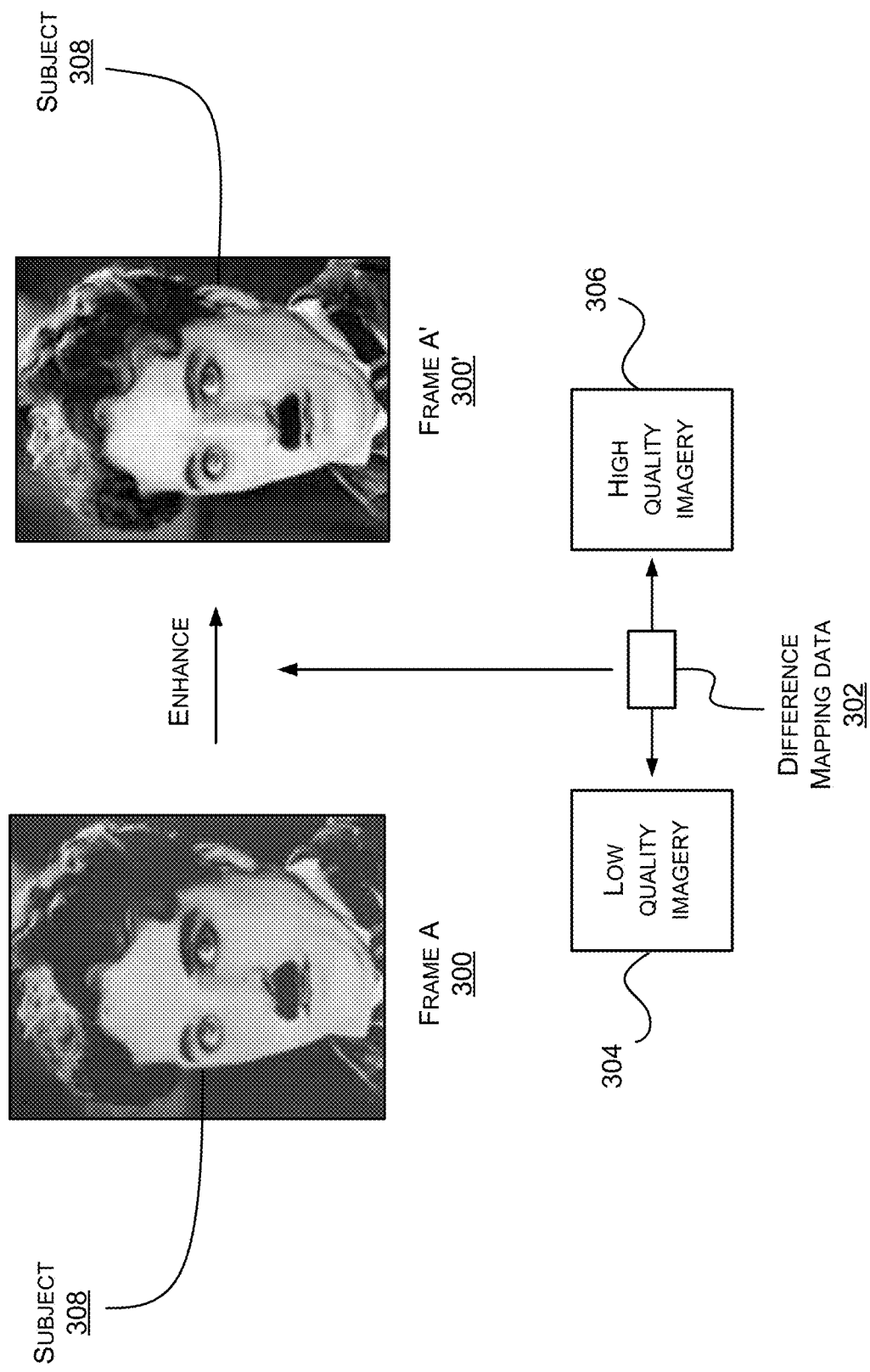
FIG. 3 is a diagram illustrating an example technique for enhancing a source image based on difference mapping data between low-quality imagery and high-quality imagery.

FIG. 3 is a diagram illustrating an example technique for enhancing a source image 300 based on difference mapping data 302 between low-quality imagery 304 and high-quality imagery 306. As mentioned above, source data 100 and/or unmodified input data 114 can be modified (e.g., manually, semi-automatically, or automatically) to obtain modified images, such as images of an enhanced quality featuring a subject 308 (e.g., a person). In the example of FIG. 3, a frame 300 (e.g., Frame A) represents an image of a first quality (e.g., a first resolution, first sharpness, etc.) featuring a body part (e.g., a face) of a subject 308. In particular, the frame 300 is unmodified (e.g., the frame 300 may represent a frame from an old movie starring a famous actor (e.g., Charlie Chaplin in the example of FIG. 3) who is now deceased). Due to the equipment (e.g., cameras, lenses, film, etc.) used to record such footage, fine details, such as blemishes, pores, and other imperfections on the subject's 308 skin and/or individual strands of hair on the subject's 308 face, may not be noticeable in the unmodified frame 300. Meanwhile, frame 300' (e.g., Frame A') represents the image of the subject 308, but enhanced to a second quality (e.g., a second resolution, second sharpness, etc.) greater than the first quality. In general, difference mapping data 302 can be used to modify (e.g., enhance) frame 300 to obtain frame 300' representing the image of the second, greater quality. In some examples, the modification(s) that is/are performed to enhance the image quality may include upscaling the image(s), sharpening the image(s), performing color transformation of the pixel values of the image(s), linearizing a 2D color space, adding details (e.g., skin pores, blemishes, freckles, hair strands, etc.) to the face featured in the image(s), or the like. In some examples, the difference mapping data 302 can include one or more differences (e.g., pixel value differences) between low-quality imagery 304 and high-quality imagery 306. For example, the low-quality imagery 304 may include an image of a first quality featuring the subject 308, and the high-quality imagery 306 may include the same image of the subject 308, but at a second quality greater than the first quality. These images of different quality can then be compared to determine the difference mapping data 302, such as differences in pixel values (e.g., a color value for a red channel, a color value for a green channel, a color value for a blue channel, and one or more values for one or more alpha channels) between the two images. In some examples, the difference mapping data 302 between the low-quality imagery 304 and the high-quality imagery 306 is generated using an additional machine learning model(s) (e.g., in the automated implementation noted above). Modifying the source image 300 based on the difference mapping data 302 causes the modified image 300' to feature the subject 308 with finer detail (e.g., with noticeable skin pores, strands of hair, freckles, blemishes, etc.), which aids the machine learning model(s) 104 in achieving a hyperreal outcome in the output data 106 that is used to generate the synthetic content 102.

Figure 4:
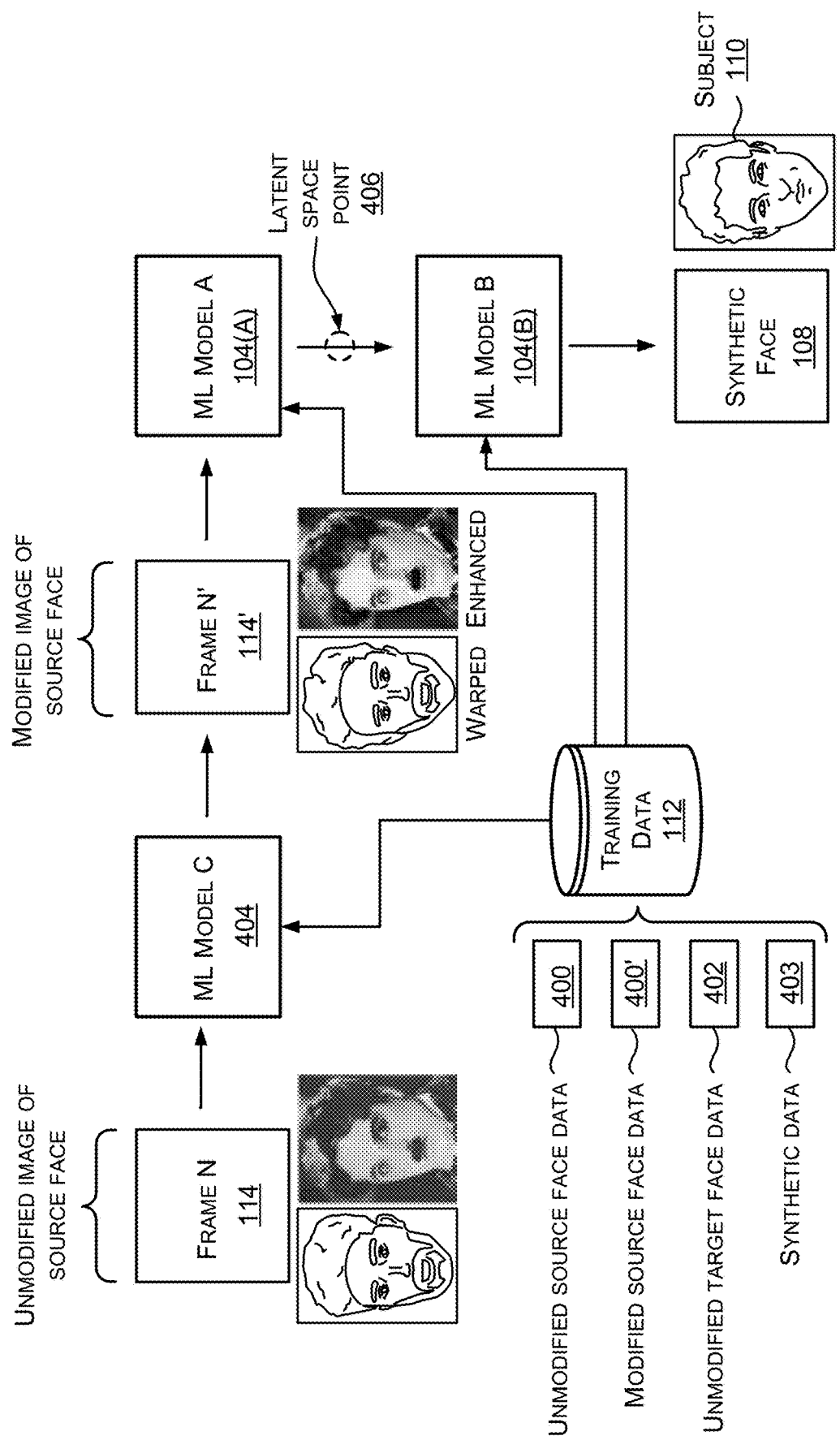
FIG. 4 is a diagram illustrating an example technique for using a trained machine learning model(s) to modify source data, and for providing the modified source data as input to a pair of trained face-swapping models to generate media content featuring a hyperreal synthetic face.

FIG. 4 is a diagram illustrating an example technique for using a trained machine learning model(s) to modify source data, and for providing the modified source data as input to a pair of trained face-swapping models to generate media content featuring a hyperreal synthetic face. Three machine learning models are depicted in FIG. 4, including a first machine learning model 104(A) ("ML model A") and a second machine learning model 104(B) ("ML model B"), which, together, may represent a multi-model implementation of the machine learning model(s) 104 introduced in FIG. 1. A third machine learning model 404 ("ML model C") depicted in FIG. 4 may be used to modify source data, as described herein, which allows the machine learning models 104(A), 104(B) to generate a high-quality, natural-looking synthetic face 108 of a subject that is, from the perspective of a viewing user, indiscernible from the actual, real life subject, thereby making the synthetic face 108 hyperreal when it is featured in media content.

In FIG. 4, the first machine learning model(s) 104(A) is configured to learn the features of the training dataset 112 associated with a source face 200. In some examples, the first model(s) 104(A) learns these features from modified source face data 400', which may be similar to the modified source data 100' described above with reference to FIG. 1. In some examples, the first model(s) 104(A) learns these features from a combination of the modified source face data 400' and unmodified source face data 400, where the unmodified source face data 400 may be similar to the unmodified source data 100 described above with reference to FIG. 1. In the process of learning the features associated with the source face 200, the first model(s) 104(A) may simplify the representation of the source face 200 in the training dataset 112 as a latent space. In machine learning, "latent space" is a representation of the compressed data stored by a machine learning model as the model learns the features of the training dataset. In some examples, more complex forms of source face data, such as images, video frames, or the like, are transformed during training into simpler representations that are more efficient to process, and these simpler representations are stored as points in the latent space of the first model(s) 104(A). In the example of FIG. 4, the modified source face data 400' from the training dataset 112 that is used to train the first model 104(A) may represent images and/or videos of the modified source face 200'. In some examples, the modified source face data 400' includes images and/or videos of the modified source face 200' with different facial expressions, from different angles, in different lighting conditions, or the like. As the first machine learning model(s) 104(A) learns from the source face data in the training dataset 112, the first model(s) 104(A) stores the relevant features of the training data 112 in a compressed representation (e.g., using an encoder, in an autoencoder implementation). This compressed form of the data features stored in the latent space of the first model(s) 104(A) is usable, such as by a decoder of the trained first model(s) 104(A), to accurately reconstruct the latent space representation into a 2D image (e.g., an image of a synthetic source face).

It is to be appreciated that the dimensions of a machine learning model's latent space can vary. That is, the individual latent spaces of the machine learning models described herein may store data points as n-dimensional feature vectors, where "n" can be any suitable integer. For the sake of visualizing the latent space of a machine learning model, imagine a 3D latent space where each latent space point is definable with three numbers that can be graphed on a 3D coordinate plane (e.g., a latent space point defined by an X value, a Y value, and a Z value). However, it is to be appreciated that a latent space of a machine learning model(s) can be, and is oftentimes, a higher-dimensional space, seeing as how more than three dimensions are often needed to store the feature data in the latent space. Within the latent space, the difference between two latent space points may be indicative of the similarity between the two latent space points. That is, similar latent space points tend to be closer to each other within the latent space, and dissimilar latent space points tend to be farther from each other within the latent space.

In FIG. 4, the second model 104(B) is configured to learn the features of the training dataset 112 associated with a target face 204. In some examples, the second model(s) 104(B) learns these features from unmodified target face data 402. In the process of learning the features associated with the target face 204, the second model(s) 104(B) may simplify the representation of the target face 204 in the training dataset 112 as a latent space. In some examples, more complex forms of target face data 402, such as images, video frames, or the like, are transformed during training into simpler representations that are more efficient to process, and these simpler representations are stored as points in the latent space of the second model(s) 104(B). In the example of FIG. 4, the unmodified target face data 402 from the training dataset 112 that is used to train the second model 104(B) may represent images and/or videos of the target face 204. In some examples, the target face data 402 includes images and/or videos of the target face 204 with different facial expressions, from different angles, in different lighting conditions, or the like. As the second machine learning model(s) 104(B) learns from the target face data 402 in the training dataset 112, the second model(s) 104(B) stores the relevant features of the training data 112 in a compressed representation (e.g., using an encoder, in an autoencoder implementation). This compressed form of the data features stored in the latent space of the second model(s) 104(B) is usable, such as by a decoder of the trained second model(s) 104(B), to accurately reconstruct the latent space representation into a 2D image (e.g., an image of a synthetic target face 108).

In some examples, the latent space of this second model 104(B) may be synchronized with the latent space of the first model 104(A) and/or the models 104(A) and 104(B) may be trained against each other. Accordingly, instances of the source face 200 featured in frames of video content may be swapped with instances of the synthetic face 108 generated by the second model 104(B). Hence, the two models 104(A) and 104(B), once trained, may be referred to as a pair of trained "face-swapping" models 104(A), 104(B).

In some examples, the source data and/or the training dataset 112 may initially include sparse data. For example, the initial training dataset 112 may include images and/or videos of the source face 200, the modified source face 200', and/or the target face 204 with certain facial expressions, from certain angles, and in certain lighting conditions, but the initial training dataset 112 may be lacking images and/or videos of these faces with other facial expressions, from other angles, and/or in other lighting conditions that may be desired for training the machine learning models described herein. Accordingly, in some examples, the training dataset 112 can be augmented with synthetic data 403 in order to obtain a more complete training dataset 112, which can then be used to train the machine learning models described herein. In some examples, the synthetic data 403 is created (or generated) using an AI model(s), such as a diffusion model(s) (e.g., a tuned diffusion model(s) that is configured to generate hyperreal synthetic content, such as synthetic faces). In some examples, the AI model(s) that is used to generate the synthetic data 403 (sometimes referred to herein as "AI-generated synthetic data 403") utilizes at least some of the existing training data 112 (e.g., a set of existing images and/or videos of a face) to generate the synthetic data 403 (e.g., AI-generated images and/or videos of a face with facial expressions, from angles, and/or in lighting conditions that were missing from the initial training dataset 112). In this manner, the training dataset 112 that is augmented with the synthetic data 403 includes a more complete dataset (e.g., a more robust set of images of a face(s), such as face images where the face(s) has a rich set of facial expressions, is shown from a rich set of angles, and/or is featured in a rich set of lighting conditions). Thus, the synthetic data 403 can be added to the initial training dataset 112 in order to "fill holes (or gaps)" in the initial training dataset 112. A training dataset 112 with a more abundant set of images to train from can allow for training the machine learning models described herein more efficiently by reducing the number of iterations that the machine learning models are retrained in order to fine tune the model(s). Furthermore, the output (e.g., the synthetic face 108) generated by the trained machine learning models described herein can be higher-quality output (e.g., a synthetic face 108 that is hyperreal) due to being trained on a more robust set of training data 112 (e.g., images of faces from angles that were originally missing from the initial training dataset 112 but are now included in the training dataset 112 that is augmented with the synthetic data 403).

In some examples, a processor(s) may analyze (e.g., scan) the initial training dataset 112 (e.g., based at least in part on the target face 204) to identify missing data. For example, upon analyzing an initial training dataset 112 (e.g., a training dataset 112 without the synthetic data 403), the processor(s) may determine that the initial training dataset 112 does not include any images of the source face 200 captured from a particular set of angles. The processor(s) can then use an AI model(s) (e.g., a tuned diffusion model(s)) and a sparse set of existing face images included in the initial training dataset 112 to generate synthetic data 403. This AI-generated synthetic data 403 can include AI-generated images of a synthetic version(s) of the source face 200 and/or a synthetic version(s) of the target face 204 from the missing set of angles. In another example, the AI-generated synthetic data 403 can include AI-generated images of a synthetic version(s) of the source face 200 and/or a synthetic version(s) of the target face 204 with missing facial expressions, in missing lighting conditions, or the like. In some examples, the synthetic data 403 may include AI-generated images of a de-aged (or aged) subject, such as a synthetic version(s) of a younger or older source face 200 and/or a synthetic version(s) of a younger or older target face 204. The processor(s) can then add the synthetic data 403 to the initial training dataset 112 in order to obtain an augmented training dataset 112 that includes the synthetic data 403, and the augmented training dataset 112 with the synthetic data 403 can be used to train the machine learning models described herein, with the objective of training the machine learning models with a more robust training dataset 112 that fills the holes (or gaps) found in the initial training dataset 112. It is to be appreciated that such an augmented training dataset 112 can be used to train the machine learning model(s) 104 at block 116 of FIG. 1 in the examples described above.

The third machine learning model(s) 404 may be trained to modify source data, as illustrated in FIG. 4. Accordingly, once trained, the third machine learning model(s) 404 may be used to generate the modified source face data 400' (or the modified source data 100' of FIG. 1), which is used to train the pair of face-swapping models 104(A), 104(B). Additionally, or alternatively, the third trained machine learning model(s) 404 may be used at runtime to generate the input data 114' that is provided as input to the first model(s) 104(A). In order to train the third model(s) 404 to perform the modifications described herein, the third model(s) 404 may be trained on two versions of an image, where one version is unmodified and the other version is modified. In this way, the third model(s) 404 learns the mapping between the two versions of the image. In a face warping scenario, for example, the third model(s) 404 may be trained on two versions of an image, where one version features an unmodified (e.g., un-warped) face of a subject, and the other version features a modified (e.g., warped) face of the subject. For example, the modified face of the subject in the second version of the image may have been enlarged, stretched, shrunk, squeezed, and/or re-shaped in the vertical (Y) dimension, the horizontal (X) dimension, or both, and/or the size, shape, position, orientation, and/or spacing of one or more facial features (e.g., eyes, nose, mouth, ears, cheekbones, etc.) may have been adjusted (e.g., scaled, moved, rotated, etc.) to some degree. Accordingly, the mapping that the third model(s) 404 learns during training may be a 2D displacement mapping and/or a 3D displacement mapping, as described above. In an image quality-enhancement scenario, as another example, the third model(s) 404 may be trained on two versions of an image, where one version is of a first quality and the other version is of a second quality greater than the first quality. In some examples, the first version of the image may represent a synthetically-degraded image (e.g., formerly a high-quality image that has been synthetically degraded for purposes of training the third model(s) 404 in part with low-quality imagery 304). The mapping that the third model(s) 404 (e.g., a super-resolution model) learns during training, in this example scenario, may be a pixel value mapping from low-quality imagery 304 to high-quality imagery 306, as described above with reference to FIG. 3.

At runtime, in order to generate the hyperreal synthetic content 102 using the trained machine learning models 104, 404, an unmodified image 114 (e.g., Frame N) featuring a body part (e.g., a face) of a subject (e.g., a person) may be provided to the third trained machine learning model(s) 404, and the third model(s) 404 generates, as output, a modified image 114' (e.g., Frame N') of the body part (e.g., face). In the face-warping example described herein, the image 114 may feature an unmodified source face 200 of a first subject 206, and the image 114' may feature a modified (e.g., warped) source face 200' of the first subject 206. In the image-quality enhancement example described herein, the image 114 may be an image of a first quality featuring a face of a subject 308, and the image 114' may be the image enhanced to a second quality greater than the first quality. In some examples, the third model(s) 404, once trained, may have built-in awareness of how to improve the quality of a face in the unmodified image 114 (e.g., adding details such as skin pores, hair strands, wrinkles, blemishes, freckles, etc.) In the example of FIG. 4, the image 114' generated by the third trained machine learning model(s) 404 may represent input data 114' that is provided to the first trained machine learning model(s) 104(A) as input.

In some examples, providing the input data 114' to the first trained machine learning model(s) 104(A), as shown in FIG. 4, is referred to as "projecting" an image against the first trained machine learning model(s) 104(A). Projecting the images 114' against the first model(s) 104(A) may serve as a request for the first model(s) 104(A) to output a latent space point 406 that corresponds to the image 114'. Accordingly, the image 114' (e.g., Frame N') is provided to the first trained machine learning model(s) 104(A) in the example of FIG. 4. In an example, the image 114' (e.g., Frame N') may be provided as input to an encoder of the first model(s) 104(A) in an autoencoder implementation. In response to providing the image 114' (e.g., Frame N') to the first model(s) 104(A), the latent space point 406 is received from the first model(s) 104(A). The received latent space point 406 may be a point within the latent space of the first model(s) 104(A) that corresponds to the face depicted in the image 114' (e.g., Frame N'). In other words, the latent space point 406 may be an n-dimensional feature vector corresponding to the first model's 104(A) compressed representation of the face with the facial expression depicted in the image 114' (e.g., Frame N').

As shown in FIG. 4, the latent space point 406 may then be provided to the second trained machine learning model(s) 104(B). In an example, the latent space point 406 may be provided as input to a decoder of the second model(s) 104(B) in an autoencoder implementation. Based at least in part on the latent space point 406, the second model(s) 104(B) may generate a synthetic face 108, which may correspond to a target face 204 of the subject 110, and which may be included in the media content to create synthetic content 102. As a result of implementing the source data modification techniques, the synthetic face 108 generated by the second trained machine learning model(s) 104(B) may be more realistic or natural-looking than without the use of source data modification techniques. Although FIG. 4 depicts a single input image 114' (e.g., Frame N') and a single synthetic face 108, it is to be appreciated that the technique illustrated in FIG. 4 may be repeated for multiple frames to generated multiple instances of the synthetic face 108, which allows for creating synthetic video content comprised of multiple frames.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
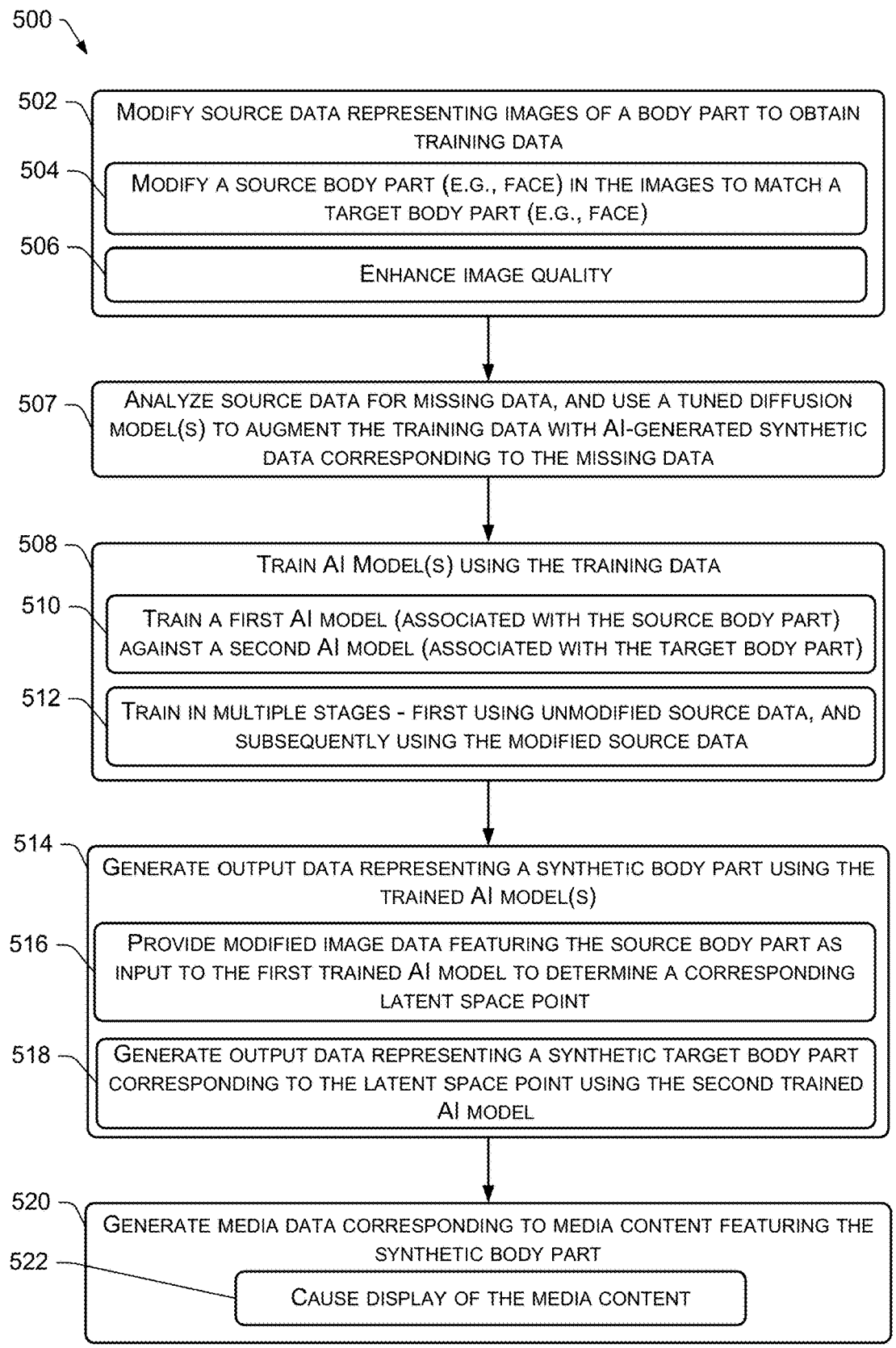
FIG. 5 is a flow diagram of an example process for modifying source data to generate hyperreal synthetic content.

FIG. 5 is a flow diagram of an example process 500 for modifying source data to generate hyperreal synthetic content. The process 500 may be implemented by one or more processors (e.g., a processor(s) of a computing system and/or computing device, such as the computing device 800 of FIG. 8). For discussion purposes, the process 500 is described with reference to the previous figures.

At 502, a processor(s) may modify (e.g., digitally modify) source data 100, 400 representing images of a body part (e.g., face) of a subject (e.g., person) to obtain training data 112. For example, the source data 100, 400 may be modified at block 502 to obtain modified source data 100', 400', which may be included in (e.g., added to) a training dataset 112 used to train one or more machine learning models 104. Sub-blocks 504 and 506 provide examples of the source data 100, 400 modification that may be performed at block 502.

At 504, for example, the processor(s) may modify the source data 100, 400 to obtain training data 112 representing the images of the subject with a modified body part. In some examples, the body part is a face and the subject is a first person. In these examples, the source data 100, 400 can be modified to obtain training data 112 representing images of the first person with a modified face that substantially matches a face of a second person in terms of a size and a shape of the second person's face. In some examples, the first person's face is a source face 200 and the second person's face is a target face 204. The modification of the source body part performed at block 504 can include, for example, adjusting a size or a shape of the source body part (e.g., source face 200) of the first person in the images, adjusting a size, a shape, a position, or an orientation of a feature of the source body part (e.g., source face 200) of the first person in the images, and/or adjusting a spacing between features of the source body part (e.g., source face 200) of the first person in the images, as described in more detail elsewhere herein. In some examples, the modifying of the source data 100, 400 at block 504 is based at least in part on one or more offsets between the body part (e.g., the face) of the first subject (e.g., first person) and the body part (e.g., the face) of the second subject (e.g., second person).

At 506, as another example of the modification that can be performed at block 502, the processor(s) may enhance the image quality of the images in the source data 100, 400. For example, the processor(s) may modify the source data 100, 400 representing images of a first quality featuring a body part of a subject to obtain training data 112 representing the images of a second quality greater than the first quality. Again, in an example where the body part is a face and the subject is a first person, the source data 100, 400 can be modified to obtain training data 112 representing images of a second quality (greater than the first quality) featuring a face of the first person. In some examples, the modification of the source data 100, 400 performed at block 506 can include, for example, increasing a resolution of the images from a first resolution to a second resolution greater than the first resolution, increasing a sharpness of the images from a first sharpness to a second sharpness greater than the first sharpness, and/or enhancing any other quality metric of the images, as described herein and/or as known to a person having ordinary skill in the art. It is to be appreciated that, in some examples, the body part (e.g., face) is modified at block 504 and the image is enhanced at block 506 (i.e., the modification performed at block 502 includes both of blocks 504 and 506). In other examples, either block 504 or block 506 is performed.

At 507, the processor(s) may analyze (e.g., scan) the source data 100, 400 (e.g., based at least in part on the target face 204) to identify missing data, and the processor(s) may use an AI model(s) (e.g., a tuned diffusion model(s)) to augment the training data 112 with AI-generated synthetic data 403 that corresponds to the missing data. For example, upon analyzing the source data 100, 400 at block 507, the processor(s) may determine that the source data 100, 400 does not include any images of the source face 200 and/or the target face 204 captured from a particular set of angles. The processor(s) can then use an AI model(s) (e.g., a tuned diffusion model(s)) at block 507 and a sparse set of existing face images included in the source data 100, 400 to generate synthetic data 403. This AI-generated synthetic data 403 can include AI-generated images of a synthetic version(s) of the source face 200 and/or a synthetic version(s) of the target face 204 from the missing set of angles. In another example, the AI-generated synthetic data 403 generated at block 507 can include AI-generated images of a synthetic version(s) of the source face 200 and/or a synthetic version(s) of the target face 204 with missing facial expressions, in missing lighting conditions, or the like. In some examples, the synthetic data 403 may include AI-generated images of a de-aged (or aged) subject, such as a synthetic version(s) of a younger or older source face 200 and/or a synthetic version(s) of a younger or older target face 204. The processor(s) can then add the synthetic data 403 to the initial training dataset 112 in order to obtain, at block 507, an augmented training dataset 112 that includes the synthetic data 403. It is to be appreciated that block 507 may, in some examples, be performed before or after block 502. In examples where block 507 is performed before block 502, the processor(s) can modify the AI-generated synthetic data 403 at block 502, such as by modifying (e.g., warping) a synthetic version of the source face 200 generated at block 507.

At 508, the processor(s) may train one or more machine learning models 104 (or AI model(s)) using the training data 112 (e.g., the augmented training dataset 112 obtained at block 507) to obtain one or more trained machine learning models 104. In some examples, the AI model(s) 104 may be trained at block 508 to generate a synthetic face(s) 108 of a subject (e.g., person), such as the subject 110 introduced in FIG. 1. The training dataset 112 that is used to train the AI model(s) 104 may include various types of data, including at least the above-noted training data 112 obtained at block 502. For example, in addition to including the modified source data 100', 400', the training dataset 112 may further include the original, unmodified source data 100, 400. Both the unmodified and the modified source data 100, 400, 100', 400' may be associated with a source face 200. Accordingly, the training dataset 112 may further include an image dataset (e.g. target face data 402) associated with a target face 204, in some examples, such as an image dataset of the face of the subject 110. Sub-blocks 510 and 512 provide examples of the AI model training that may be performed at block 508.

At 510, for example, the processor(s) may train a first AI model(s) 104(A) against a second AI model(s) 104(B) using the training data 112 obtained at block 502 to obtain a first trained AI model(s) 104(A) and a second trained AI model(s) 104(B). In some examples, the first trained AI model(s) 104(A) is associated with a first person (e.g., a person with the source face 200) and the second trained AI model(s) 104(B) is associated with a second person (e.g., a person with the target face 204). In other words, the AI models 104(A) and 104(B) may learn to face swap (e.g., to swap the source face 200 with a hyperreal synthetic face 108 that corresponds to the target face 204).

At 512, for example, the AI model(s) 104 may be trained in multiple stages (or multiple passes). For example, the processor(s) may train the AI model(s) 104 at a first time using the (unmodified) source data 100, 400 as first training data 112, and retrain the AI model(s) 104 at a second time subsequent to the first time using the modified source data 100', 400' obtained at block 502 as second training data 112. In other words, in a first pass, the AI model(s) 104 may be trained without any modification of the source data 100, 400 used as training data 112, and then, in a second pass, the AI model(s) 104 can be retrained by running an adjustment path on the source data 100 to obtain modified source data 100', 400' (e.g., images of warped faces) that is used in the retraining of the AI model(s) 104.

At 514, the processor(s) may use the trained AI model(s) 104 to generate output data 106 representing a synthetic body part (e.g., a synthetic face 108). In some examples, the input data provided to the trained AI model(s) 104 to generate the output data 106 at block 514 represents an image 114' featuring the body part (e.g., face) of a subject (e.g., person) that is featured in the source data 100, 400. The modified image 114' may feature a modified body part (e.g., face) of the subject (e.g., person), for example, or the image 114' may have been modified in terms of quality (e.g., from a first quality to a second quality greater than the first quality). In other words, the image 114' may be an enhanced image featuring the body part (e.g., face) of the subject, in some examples. Sub-blocks 516 and 518 provide examples of generating the output data 106 using the trained AI model(s) 104 at block 514.

At 516, the processor(s) may provide, as input data to the first trained AI model(s) 104(A), an image 114' featuring the body part (e.g., face) of a subject (e.g., person) that is featured in the source data 100, 400. As a result of providing this input data to the first trained AI model(s) 104(A), the processor(s) may determine a point 406 in a latent space of the first trained AI model(s) 104(*a*) that corresponds to the image 114'. In some examples, the image 114' features a modified body part of the subject. In this sense, an original image 114 may have been modified by modifying the body of part of the subject to obtain the image 114', as described herein. In another example, the image 114' may represent an enhanced image in the sense that an original image 114 of a first quality featuring the body part of the subject may have been modified to obtain the image 114' of a second quality greater than the first quality (e.g., a higher resolution image featuring the body part of the subject). In some examples, the body part featured in the input image 114' is a face of a first subject (e.g., a first person).

At 518, the processor(s) may generate the output data 106 using the second trained AI model(s) 104(B) based at least in part on the point 406 in the latent space of the first trained AI model(s) 104(A). In examples where the output data 106 represents a synthetic face 108 of a second subject 110 (e.g., a second person), the synthetic face 108 may correspond to the face featured in the input data (e.g., the input image 114'). In other words, the synthetic face 108 may be in the same or similar orientation, the same or similar size, and/or at the same position as the face in the input image 114'. If face swapping is performed across multiple frames, the trained AI model(s) 104(A), 104(B) may be used to generate multiple instances of the synthetic face 108 across multiple frames of input data.

At 520, the processor(s) may generate, based at least in part on the output data 106, media data corresponding to media content (e.g., synthetic content 102) featuring the synthetic body part (e.g., the synthetic face 108). In some examples, the media data is video data, and the media content is video content. In some examples, the generating of the media data at block 520 includes overlaying instances of the synthetic face 108 generated at block 514 on a 2D representations of the face depicted in the images (e.g., frames) of the input data 114'. For example, the media content may be generated by swapping the face (e.g., modified face) of the first person featured in the image 114' with the synthetic face 108 of the second person. In some examples, at block 520 or afterwards, postproduction video editing may be performed to enhance the synthetic content 102 in terms of color grading, adding highlights, skin texture, or the like, to make the synthetic content look as realistic as possible.

At 522, the processor(s) may cause the media content (e.g., synthetic content 102) to be displayed on a display based at least in part on the output data 106. For example, the media data corresponding to the media content (e.g., synthetic content 102) may be stored in a datastore and accessed at any point in time for display on a computing device. For example, a user computing device may request access to the media data, and the media data may be processed on the user computing device to display the media content (e.g., synthetic content 102) on a display of the user computing device. Such a user computing device may be any suitable type of device including a mobile phone, a tablet computer, a personal computer (PC), a head-mounted display (HMD), such as a virtual reality (VR) headset or an augmented reality (AR) headset, a game console and associated display, or any suitable type of user computing device with a display. In some examples, the media data generated at block 520 is made accessible over a network, such as a wide area network (e.g., the Internet). The media content (e.g., synthetic content 102) that is displayed may feature a synthetic face(s) 108 that hyperreal due to the source data modification that is performed in combination with the remaining operations of the process 500.

It is to be appreciated that the process 500 may be iteratively performed with feedback for fine-tuning the AI model(s) at block 508. In other words, the output data 106 generated at block 518 can be evaluated and, based on the evaluation of the output data 106, source data can be modified differently at block 502 and/or different synthetic data 403 can be generated at block 507 to augment the training dataset 112 to retrain the AI model(s) at block 508 with an objective of improving the quality of the output data 106 in future iterations of the process 500.

Figure 6:
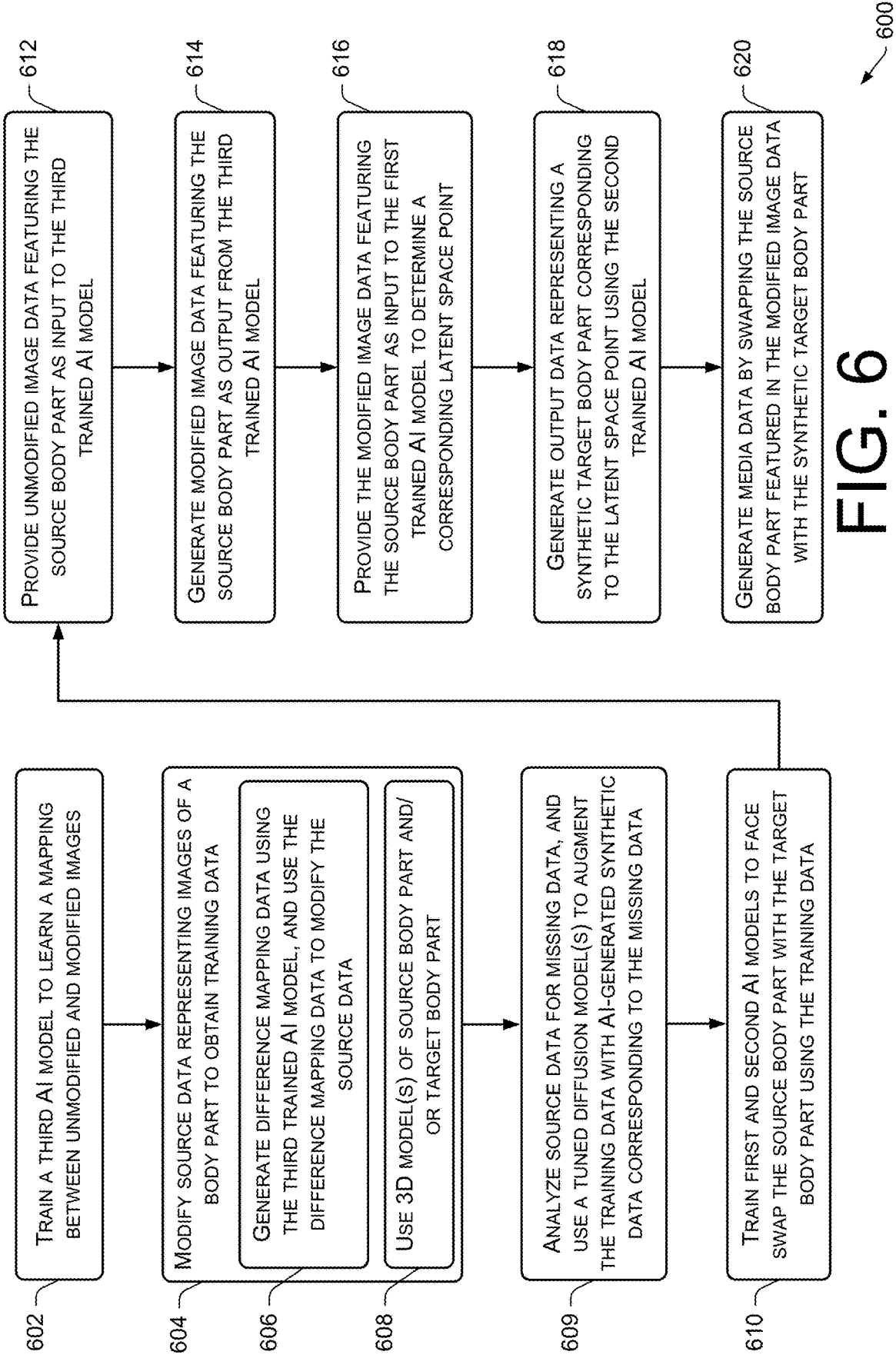
FIG. 6 is a flow diagram of an example process for training multiple machine learning models to modify source data and to generate media content featuring a hyperreal synthetic body part.

FIG. 6 is a flow diagram of an example process 600 for training multiple machine learning models to modify source data and to generate media content featuring a hyperreal synthetic body part. The process 600 may be implemented by one or more processors (e.g., a processor(s) of a computing system and/or computing device, such as the computing device 800 of FIG. 8). For discussion purposes, the process 600 is described with reference to the previous figures.

At 602, a processor(s) may train a machine learning model(s) 404 (or AI model(s)) to learn a mapping between unmodified and modified images, where the AI model(s) 404 being trained at block 602 is referred to as a third (additional) AI model(s) 404 because a separate pair of face-swapping models (e.g., a first AI model(s) 104(A) and a second AI model(s) 104(B)) are to be used to generate a synthetic face 108. In some examples, the unmodified images used to train the third AI model(s) 404 at block 602 are images of a body part (e.g., face) of a first subject (e.g., person), and the modified images used to train the third AI model(s) 404 at block 602 are images of the first subject (e.g., person) with the modified body part (e.g., face), wherein the modified body part of the first subject may substantially match a body part (e.g., face) of a second subject (e.g., person) in terms of a size or a shape of the body part of the second subject, and/or in terms of a size, a shape, an orientation, or a spacing of one or more features (e.g., eyes, nose, mouth, ears, cheekbones, etc.) of the body part of the second subject. In some examples, the unmodified images used to train the third AI model(s) 404 at block 602 are images of a first quality, and the modified images used to train the third AI model(s) 404 at block 602 are images of a second quality greater than the first quality, where the images may feature a body part (e.g., face) of a subject (e.g., person). As a result of training the third AI model(s) 404 at block 602, a third trained AI model(s) 404 is obtained.

At 604, the processor(s) may modify source data 100, 400 representing images of a body part (e.g., face) of a subject (e.g., person) to obtain training data 112. For example, the source data 100, 400 may be modified at block 604 to obtain modified source data 100', 400', which may be included in (e.g., added to) a training dataset 112 used to train one or more AI models 104 (e.g., a pair of face-swapping AI models 104(A), 104(B)). In some examples, the third trained AI model(s) 404 may modify the source data 100, 400 at block 604. Sub-blocks 606 and 608 provide further examples of the source data 100, 400 modification that may be performed at block 604.

At 606, for example, the processor(s) may use the third trained AI model(s) 404 to generate difference mapping data 202, 302 (e.g., a 2D displacement mapping between a body part (e.g., face) of a first subject (e.g., person) featured in the source data 100, 400 and a body part (e.g., face) of a second subject (e.g., person) to be featured in the to-be-created synthetic content 102, a difference mapping of pixel values between low-quality imagery 304 and high-quality imagery 306, etc.). Accordingly, the modifying of the source data 100, 400 at block 604 may be based at least in part on the difference mapping data 202, 302 generated at block 606.

At 608, as another example, the processor(s) may use a 3D model(s) of a body part(s) (e.g., face(s)) to perform the source data 100, 400 modification at block 604. For example, the modifying of the source data 100 at block 604 may be based at least in part on a 3D model of a body part (e.g., face) of the second subject (e.g., person), such as the target face 204, and/or a 3D model of a body part (e.g., face) of the first subject (e.g., person), such as the source face 200.

At 609, the processor(s) may analyze (e.g., scan) the source data 100, 400 (e.g., based at least in part on the target face 204) to identify missing data, and the processor(s) may use an AI model(s) (e.g., a tuned diffusion model(s)) to augment the training data 112 with AI-generated synthetic data 403 that corresponds to the missing data. For example, upon analyzing the source data 100, 400 at block 609, the processor(s) may determine that the source data 100, 400 does not include any images of the source face 200 and/or the target face 204 captured from a particular set of angles. The processor(s) can then use an AI model(s) (e.g., a tuned diffusion model(s)) at block 609 and a sparse set of existing face images included in the source data 100, 400 to generate synthetic data 403. This AI-generated synthetic data 403 can include AI-generated images of a synthetic version(s) of the source face 200 and/or a synthetic version(s) of the target face 204 from the missing set of angles. In another example, the AI-generated synthetic data 403 generated at block 609 can include AI-generated images of a synthetic version(s) of the source face 200 and/or a synthetic version(s) of the target face 204 with missing facial expressions, in missing lighting conditions, or the like. In some examples, the synthetic data 403 may include AI-generated images of a de-aged (or aged) subject, such as a synthetic version(s) of a younger or older source face 200 and/or a synthetic version(s) of a younger or older target face 204. The processor(s) can then add the synthetic data 403 to the initial training dataset 112 in order to obtain, at block 609, an augmented training dataset 112 that includes the synthetic data 403. It is to be appreciated that block 609 may, in some examples, be performed before or after block 604. In examples where block 609 is performed before block 604, the processor(s) can modify the AI-generated synthetic data 403 at block 604, such as by modifying (e.g., warping) a synthetic version of the source face 200 generated at block 609.

At 610, the processor(s) may train a first AI model(s) 104(A) against a second AI model(s) 104(B) using the training data 112 (e.g., the training data 112 obtained at block 604 and/or the augmented training data 112 obtained at block 609) to obtain a first trained AI model(s) 104(A) and a second trained AI model(s) 104(B). In some examples, the first trained AI model(s) 104(A) is associated with the first subject (e.g., a person with the source face 200, the subject 308 shown in FIG. 3, etc.) and the second trained AI model(s) 104(B) is associated with the second subject (e.g., a person with the target face 204). In other words, the AI models 104(A) and 104(B) may learn to face swap (e.g., to swap the source face 200 with a hyperreal synthetic face that corresponds to the target face 204).

At 612, the processor(s) may provide, as input data 114 to the third trained AI model(s) 404, an unmodified image(s) featuring a body part (e.g., face) of a subject (e.g., person), such as the face of the first subject. In some examples, the unmodified image(s) is an image of a first quality, such as the original quality of the image (e.g., the original resolution, sharpness, etc.).

At 614, the processor(s) may use the third trained AI model(s) 404 to generate modified image data based at least in part the unmodified image(s) featuring the body part of the subject that was provided to the third trained AI model(s) 404 at block 612. The modified image data generated as output from the third trained AI model(s) 404 at block 614 may feature the body part (e.g., face) of the subject (e.g., person) and may be configured to be used as input data 114' to the pair of face-swapping AI model(s) 104(A), 104(B). In an example, this input data 114' may feature a modified (e.g., warped) body part (e.g., face) of the subject (e.g., person). In another example, this input data 114' may represent an image 114' of a second quality greater than the first quality (e.g., an enhanced, higher resolution image featuring the body part of the subject).

At 616, the processor(s) may provide, the input data 114' to the first trained AI model(s) 104(A), the input data 114' representing an image(s) 114' featuring the body part (e.g., face) of a subject (e.g., person) that is featured in the source data 100. As a result of providing this input data 114' to the first trained AI model(s) 104(A), the processor(s) may determine a point 406 in a latent space of the first trained AI model(s) 104(a) that corresponds to the image 114'. As noted above, the image 114' may feature a modified body part of the subject, and/or the image 114' may represent an enhanced image, as described herein.

At 618, the processor(s) may generate output data 106 using the second trained AI model(s) 104(B) based at least in part on the point 406 in the latent space of the first trained AI model(s) 104(A). In examples where the output data 106 represents a synthetic face 108 of a second subject 110 (e.g., a second person), the synthetic face 108 may correspond to the face featured in the input data (e.g., the input image 114'). In other words, the synthetic face 108 may be in the same or similar orientation, the same or similar size, and/or at the same position as the face in the input image 114'. If face swapping is performed across multiple frames, the trained AI model(s) 104(A), 104(B) may be used to generate multiple instances of the synthetic face 108 across multiple frames of input data.

At 620, the processor(s) may generate, based at least in part on the output data 106, media data corresponding to media content (e.g., synthetic content 102) featuring the synthetic body part (e.g., the synthetic face 108). In some examples, the media data is video data, and the media content is video content. In some examples, the generating of the media data at block 620 includes overlaying instances of the synthetic face 108 generated at block 618 on a 2D representations of the face depicted in the images (e.g., frames) of the input data 114'. For example, the media content may be generated by swapping the face (e.g., modified face) of the first person featured in the image 114' with the synthetic face 108 of the second person. In some examples, at block 620 or afterwards, postproduction video editing may be performed to enhance the synthetic content 102 in terms of color grading, adding highlights, skin texture, or the like, to make the synthetic content look as realistic as possible. Additionally, the processor(s) may cause the media content (e.g., synthetic content 102) to be displayed on a display based at least in part on the output data 106, as discussed above at least with respect to block 522 of the process 500.

In some examples, latent space manipulation and neural animation can be used to further improve or alter the quality of the synthetic body part (e.g., the synthetic face 108) that is generated by the trained machine learning models described herein. Latent space manipulation (or editing) and neural animation techniques are disclosed in U.S. patent application Ser. No. 18/089,487, the contents of which is incorporated by reference herein in its entirety.

It is to be appreciated that the process 600 may be iteratively performed with feedback for fine-tuning the AI model(s) at block 610. In other words, the output data 106 generated at block 618 can be evaluated and, based on the evaluation of the output data 106, source data can be modified differently at block 604 and/or different synthetic data 403 can be generated at block 609 to augment the training dataset 112 to retrain the AI model(s) at block 610 with an objective of improving the quality of the output data 106 in future iterations of the process 600.

Figure 7:
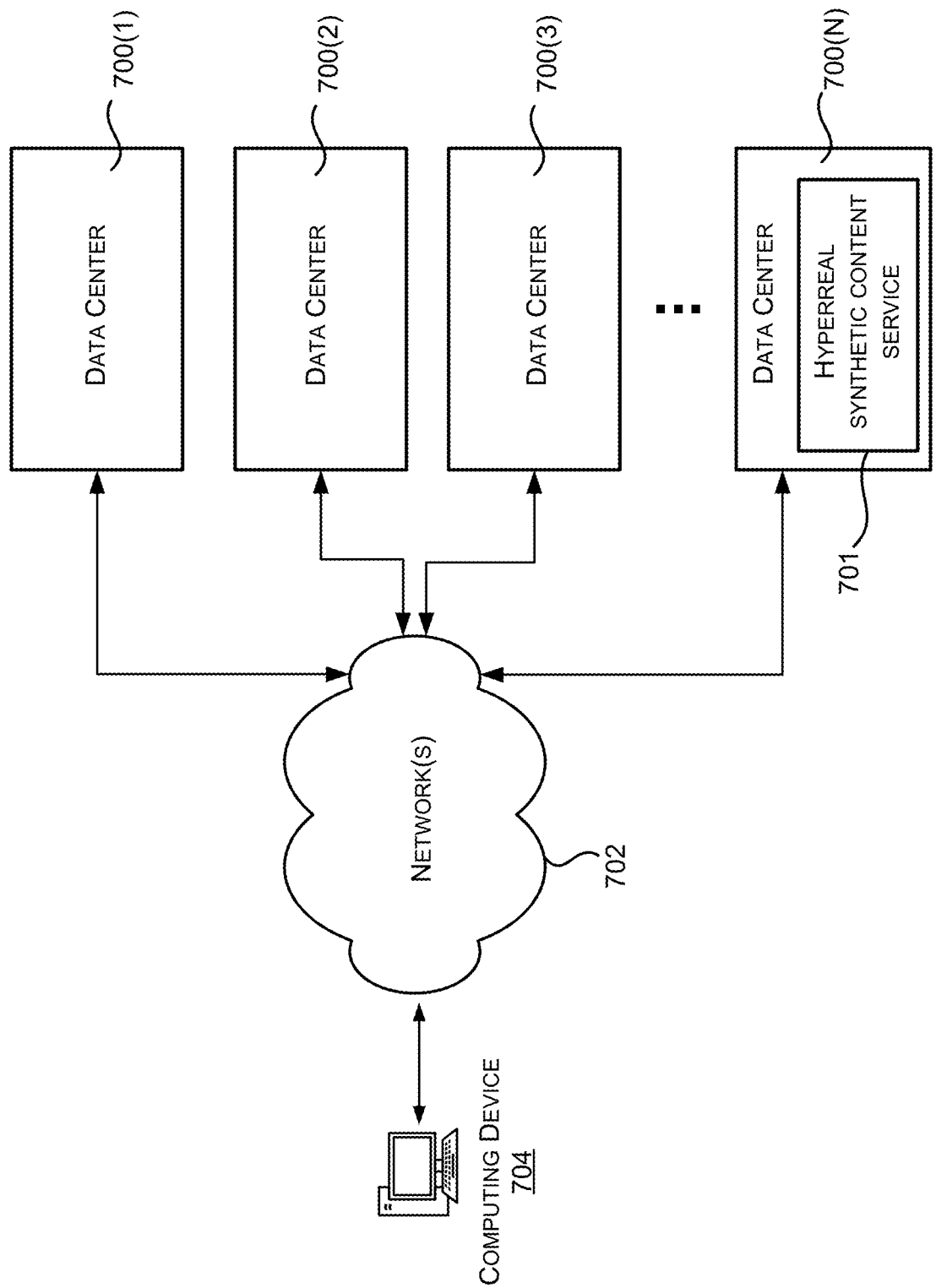
FIG. 7 is a system and network diagram that shows an illustrative operating environment that includes one or more components configured to implement aspects of the functionality described herein.

FIG. 7 is a system and network diagram that shows one illustrative operating environment for the configurations disclosed herein that includes a hyperreal synthetic content service 701 configured to perform the techniques and operations described herein. The computing resources utilized by the hyperreal synthetic content service 701 are enabled in one implementation by one or more data centers 700(1)-(N) (collectively 700). The data centers 700 are facilities utilized to house and operate computer systems and associated components. The data centers 700 typically include redundant and backup power, communications, cooling, and security systems. The data centers 700 can also be located in geographically disparate locations. In FIG. 7, the data center 700(N) is shown as implementing the hyperreal synthetic content service 701. That is, the computing resources provided by the data center(s) 700 can be utilized to implement the techniques and operations described herein. In an example, these computing resources can include data storage resources, data processing resources, such as virtual machines, networking resources, data communication resources, network services, and other types of resources. Data processing resources can be available as physical computers or virtual machines in a number of different configurations. The virtual machines can be configured to execute applications, including web servers, application servers, media servers, database servers, and/or other types of programs. Data storage resources can include file storage devices, block storage devices, and the like. The data center(s) 700 can also be configured to provide other types of computing resources not mentioned specifically herein.

Users can access the above-mentioned computing resources over a network(s) 702, which can be a wide area communication network ("WAN"), such as the Internet, an intranet or an Internet service provider ("ISP") network or a combination of such networks. For example, and without limitation, a computing device 704 operated by a user can be utilized to access the hyperreal synthetic content service 701 by way of the network(s) 702. It should be appreciated that a local-area network ("LAN"), the Internet, or any other networking topology known in the art that connects the data centers 700 to remote user can be utilized. It should also be appreciated that combinations of such networks can also be utilized.

Figure 8:
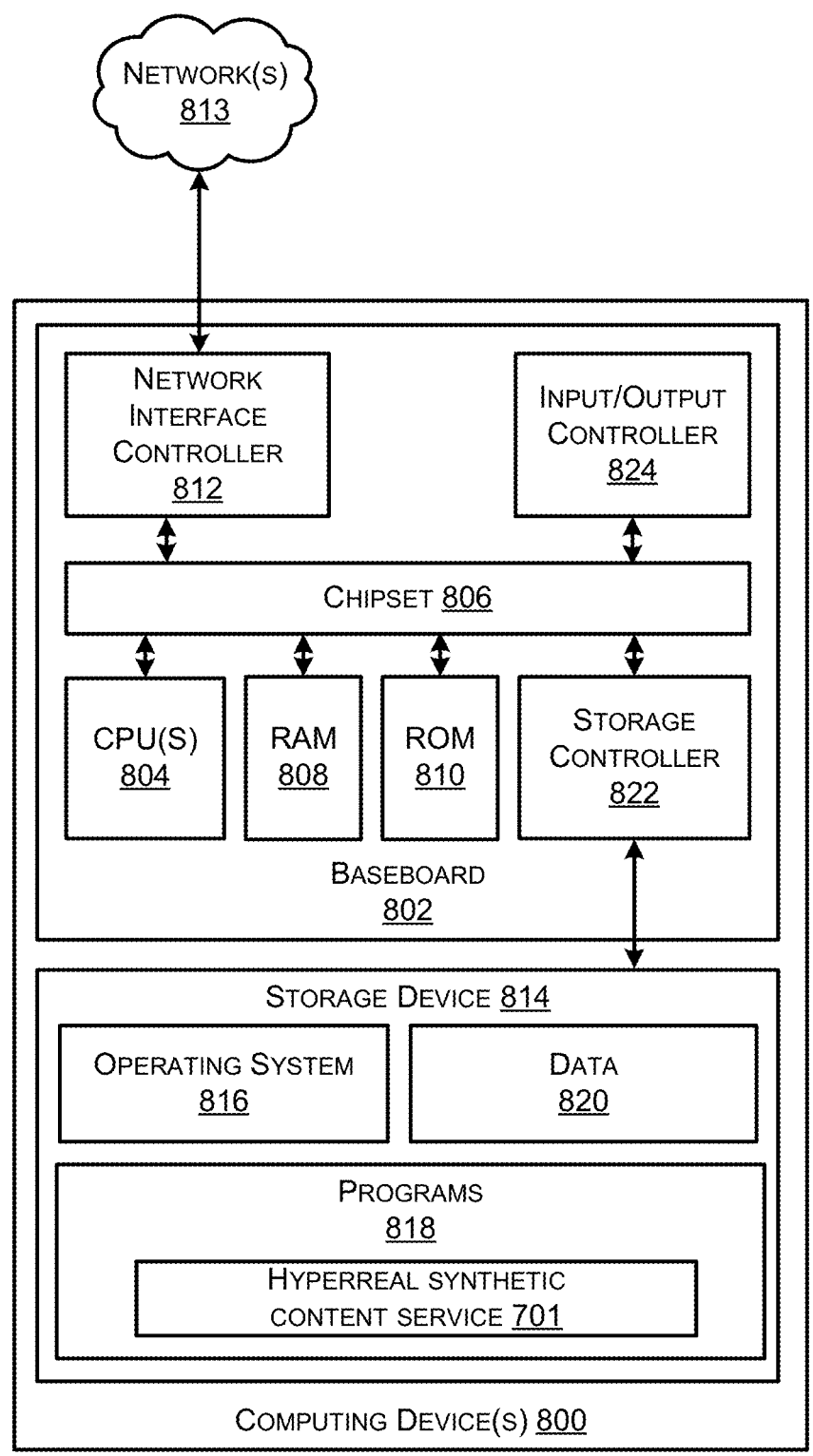
FIG. 8 is a computer architecture diagram showing an illustrative computer architecture for implementing a computing device(s) that can be utilized to implement aspects of the various technologies presented herein.

FIG. 8 shows an example computer architecture for a computing device(s) 800 capable of executing program components for implementing the functionality described above. The computer architecture shown in FIG. 8 may represent a workstation, desktop computer, laptop, tablet, network appliance, smartphone, server computer, or other computing device, and can be utilized to execute any of the software components presented herein. For example, the computing device(s) 800 may represent a server(s) of a data center 700. In another example, the computing device(s) 800 may represent a user computing device, such as the computing device 704.

The computer 800 includes a baseboard 802, which is a printed circuit board (PCB) to which a multitude of components or devices can be connected by way of a system bus or other electrical communication paths. In one illustrative configuration, one or more CPUs 804 operate in conjunction with a chipset 806. The CPUs 804 can be standard programmable processors that perform arithmetic and logical operations necessary for the operation of the computer 800, and the CPUs 804 may be generally referred to herein as a processor(s), such as the processor(s) for implementing the process 600 and/or the process 700, as described above.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may represent the "hardware bus" described above, and it can provide an interface to a random access memory ("RAM") 808, used as the main memory in the computing device(s) 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computing device(s) 800 in accordance with the configurations described herein.

The computing device(s) 800 can operate in a networked environment using logical connections to remote computing devices and computer systems through a network(s) 813, which may be the same as, or similar to, the network(s) 702. The chipset 806 can include functionality for providing network connectivity through a network interface controller (NIC) 812, such as a gigabit Ethernet adapter. The NIC 812 may be capable of connecting the computing device(s) 800 to other computing devices over the network(s) 813. It should be appreciated that multiple NICs 812 can be present in the computing device(s) 800, connecting the computer to other types of networks and remote computer systems.

The computing device(s) 800 can be connected to a mass storage device 814 that provides non-volatile storage for the computer. The mass storage device 814 can store an operating system 816, programs 818, and data 820, to carry out the techniques and operations described in greater detail herein. For example, the programs 818 may include the hyperreal synthetic content service 701 to implement the techniques and operations described herein, and the data 820 may include the various model(s) 104, 404 and data 112 used to train the model(s) 104, 404, as well as the media data described herein, such as video data corresponding to synthetic content, as described herein. The mass storage device 814 can be connected to the computing device 800 through a storage controller 822 connected to the chipset 806. The mass storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device(s) 800 can store data on the mass storage device 814 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 814 is characterized as primary or secondary storage, and the like.

For example, the computing device(s) 800 can store information to the mass storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device(s) 800 can further read information from the mass storage device 814 by detecting the physical states or characteristics of one or more particular locations within the physical storage units.

In addition to the mass storage device 814 described above, the computing device(s) 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device(s) 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 814 or other computer-readable storage media is encoded with computer-executable instructions which, when loaded into the computing device(s) 800, transform the computer from a general-purpose computing system into a special-purpose computer capable of implementing the configurations described herein. These computer-executable instructions transform the computing device(s) 800 by specifying how the CPUs 804 transition between states, as described above. According to one configuration, the computing device(s) 800 has access to computer-readable storage media storing computer-executable instructions which, when executed by the computing device(s) 800, perform the various processes described above. The computing device(s) 800 can also include computer-readable storage media storing executable instructions for performing any of the other computer-implemented operations described herein.

The computing device(s) 800 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device.

EXAMPLE CLAUSES

1. A method comprising: modifying, by one or more processors, source data representing images of a first quality featuring a face of a first person to obtain training data representing the images of a second quality greater than the first quality; training, by the one or more processors, a first machine learning model against a second machine learning model using the training data to obtain a first trained machine learning model and a second trained machine learning model, the first trained machine learning model associated with the first person and the second trained machine learning model associated with a second person; providing, by the one or more processors, input data representing an image of the second quality featuring the face of the first person to the first trained machine learning model to determine a point in a latent space of the first trained machine learning model that corresponds to the image featuring the face of the first person; generating, by the one or more processors, using the second trained machine learning model based at least in part on the point in the latent space of the first trained machine learning model, output data representing a synthetic face of the second person; and causing, by the one or more processors, media content to be displayed on a display based at least in part on the output data, the media content having been generated by swapping the face of the first person featured in the image with the synthetic face of the second person.
2. The method of clause 1, further comprising generating, by the one or more processors, the input data using a third trained machine learning model based at least in part the image of the first quality.
3. The method of clause 2, further comprising training a third machine learning model using the images of the first quality and the images of the second quality to obtain the third trained machine learning model.
4. The method of any one of clauses 1 to 3, wherein the modifying comprises at least one of: increasing a resolution of the images from a first resolution to a second resolution greater than the first resolution; or increasing a sharpness of the images from a first sharpness to a second sharpness greater than the first sharpness.
5. The method of any one of clauses 1 to 4, further comprising: analyzing, by the one or more processors, the source data to identify missing data; generating, by the one or more processors, using a diffusion model, synthetic data that corresponds to the missing data; and adding, by the one or more processors, the synthetic data to the training data, wherein the first machine learning model is trained against the second machine learning model using the training data that includes the synthetic data.
6. A method comprising: modifying, by one or more processors, source data representing images of a first quality featuring a body part of a subject to obtain training data representing the images of a second quality greater than the first quality; training, by the one or more processors, one or more machine learning models using the training data to obtain one or more trained machine learning models; generating, by the one or more processors, using the one or more trained machine learning models based at least in part on input data representing an image of the second quality featuring the body part of the subject, output data representing a synthetic body part; and generating, by the one or more processors, based at least in part on the output data, media data corresponding to media content featuring the synthetic body part.
7. The method of clause 6, further comprising generating, by the one or more processors, the input data using an additional trained machine learning model based at least in part the image of the first quality.
8. The method of clause 6 or 7, wherein the modifying comprises at least one of: increasing a resolution of the images from a first resolution to a second resolution greater than the first resolution; or increasing a sharpness of the images from a first sharpness to a second sharpness greater than the first sharpness.
9. The method of any one of clauses 6 to 8, wherein the training data is second training data, and the training comprises: training, by the one or more processors, the one or more machine learning models at a first time using the source data as first training data; and retraining, by the one or more processors, the one or more machine learning models at a second time subsequent to the first time using the second training data.

10. The method of any one of clauses 6 to 9, wherein: the one or more trained machine learning models include a first trained machine learning model and a second trained machine learning model; and the generating of the output data comprises: providing, by the one or more processors, the input data to the first trained machine learning model to determine a point in a latent space of the first trained machine learning model that corresponds to the image of the second quality featuring the body part of the subject; and generating, by the one or more processors, the output data using the second trained machine learning model based at least in part on the point in the latent space of the first trained machine learning model.

11. The method of any one of clauses 6 to 10, wherein the generating of the media data comprises swapping the body part of the subject featured in image with the synthetic body part.

12. The method of any one of clauses 6 to 11, wherein: the subject is a first subject; the synthetic body part is associated with a second subject; and the modifying is based at least in part on a three-dimensional (3D) model of a body part of the second subject.

13. The method of clause 12, wherein the 3D model is a second 3D model, and the modifying is based at least in part on a first 3D model of the body part of the first subject.

14. The method of any one of clauses 6 to 13, wherein: the subject is a first subject; the body part is a face of the first subject; and the synthetic body part is a synthetic face of a second subject.

15. The method of any one of clauses 6 to 14, further comprising: analyzing, by the one or more processors, the source data to identify missing data; generating, by the one or more processors, using a diffusion model, synthetic data that corresponds to the missing data; and adding, by the one or more processors, the synthetic data to the training data, wherein the one or more machine learning models are trained using the training data that includes the synthetic data.

16. A system comprising: one or more processors; and memory storing computer-executable instructions that, when executed by the one or more processors, cause performance of operations comprising: modifying source data representing images of a first quality featuring a body part of a subject to obtain training data representing the images of a second quality greater than the first quality; training one or more machine learning models using the training data to obtain one or more trained machine learning models; generating, using the one or more trained machine learning models based at least in part on input data representing an image of the second quality featuring the body part of the subject, output data representing a synthetic body part; and generating, based at least in part on the output data, media data corresponding to media content featuring the synthetic body part.

17. The system of clause 16, the operations further comprising generating the input data using an additional trained machine learning model based at least in part the image of the first quality.

18. The system of clause 16 or 17, wherein the modifying comprises at least one of: increasing a resolution of the images from a first resolution to a second resolution greater than the first resolution; or increasing a sharpness of the images from a first sharpness to a second sharpness greater than the first sharpness.

19. The system of any one of clauses 16 to 18, wherein the training data is second training data, and the training comprises: training the one or more machine learning models at a first time using the source data as first training data; and retraining the one or more machine learning models at a second time subsequent to the first time using the second training data.

20. The system of any one of clauses 16 to 19, wherein: the subject is a first subject; the body part is a face of the first subject; and the synthetic body part is a synthetic face of a second subject.

21. The system of any one of clauses 16 to 20, wherein: the subject is a first subject; the synthetic body part is associated with a second subject; and the modifying is based at least in part on a three-dimensional (3D) model of a body part of the second subject.

22. The system of any one of clauses 16 to 21, the operations further comprising causing the media content to be displayed on a display.

23. The system of any one of clauses 16 to 22, the operations further comprising: analyzing the source data to identify missing data; generating, using a diffusion model, synthetic data that corresponds to the missing data; and adding the synthetic data to the training data, wherein the one or more machine learning models are trained using the training data that includes the synthetic data.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the disclosed techniques and systems in diverse forms thereof.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
modifying, by one or more processors, source data representing images of a face of a first person to obtain training data representing the images of the first person with a modified face that substantially matches a size and a shape of a face of a second person;
training, by the one or more processors, a first machine learning model against a second machine learning model using the training data to obtain a first trained machine learning model and a second trained machine learning model, the first trained machine learning model associated with the first person and the second trained machine learning model associated with the second person;
providing, by the one or more processors, input data representing an image featuring the modified face of the first person to the first trained machine learning model to determine a point in a latent space of the first trained machine learning model that corresponds to the image featuring the modified face of the first person;

generating, by the one or more processors, using the second trained machine learning model based at least in part on the point in the latent space of the first trained machine learning model, output data representing a synthetic face of the second person; and causing, by the one or more processors, media content to be displayed on a display based at least in part on the output data, the media content having been generated by swapping the modified face of the first person featured in the image with the synthetic face of the second person.

2. The method of claim 1, wherein the modifying is based at least in part on one or more offsets between the face of the first person and the face of the second person.

3. The method of claim 1, wherein the modifying comprises at least one of:
adjusting a size or a shape of the face of the first person in the images;
adjusting a size, a shape, a position, or an orientation of a feature of the face of the first person in the images; or
adjusting a spacing between features of the face of the first person in the images.

4. The method of claim 1, further comprising:
generating, using a third trained machine learning model, a two-dimensional (2D) displacement mapping between the face of the first person and the face of the second person,
wherein the modifying is based at least in part on the 2D displacement mapping.

5. The method of claim 1, further comprising:
analyzing, by the one or more processors, the source data to identify missing data;
generating, by the one or more processors, using a diffusion model, synthetic data that corresponds to the missing data; and
adding, by the one or more processors, the synthetic data to the training data,
wherein the first machine learning model is trained against the second machine learning model using the training data that includes the synthetic data.

6. A system comprising:
one or more processors; and
memory storing computer-executable instructions that, when executed by the one or more processors, cause performance of operations comprising:
modifying source data representing images of a face of a first person to obtain training data representing the images of the first person with a modified face that substantially matches a size and a shape of a face of a second person;
training a first machine learning model against a second machine learning model using the training data to obtain a first trained machine learning model and a second trained machine learning model, the first trained machine learning model associated with the first person and the second trained machine learning model associated with the second person;
providing input data representing an image featuring the modified face of the first person to the first trained machine learning model to determine a point in a latent space of the first trained machine learning model that corresponds to the image featuring the modified face of the first person;
generating, using the second trained machine learning model based at least in part on the point in the latent space of the first trained machine learning model, output data representing a synthetic face of the second person; and causing media content to be displayed on a display based at least in part on the output data, the media content having been generated by swapping the modified face of the first person featured in the image with the synthetic face of the second person.

7. The system of claim 6, wherein the modifying is based at least in part on one or more offsets between the face of the first person and the face of the second person.

8. The system of claim 6, wherein the modifying comprises at least one of:
adjusting a size or a shape of the face of the first person in the images;
adjusting a size, a shape, a position, or an orientation of a feature of the face of the first person in the images; or
adjusting a spacing between features of the face of the first person in the images.

9. The system of claim 6, the operations further comprising:
generating, using a third trained machine learning model, a two-dimensional (2D) displacement mapping between the face of the first person and the face of the second person,
wherein the modifying is based at least in part on the 2D displacement mapping.

10. The system of claim 6, the operations further comprising:
analyzing the source data to identify missing data;
generating, using a diffusion model, synthetic data that corresponds to the missing data; and
adding the synthetic data to the training data,
wherein the first machine learning model is trained against the second machine learning model using the training data that includes the synthetic data.

11. One or more non-transitory computer-readable media storing computer-executable instructions that, when executed by one or more processors, cause performance of operations comprising:
modifying source data representing images of a face of a first person to obtain training data representing the images of the first person with a modified face that substantially matches a size and a shape of a face of a second person;
training a first machine learning model against a second machine learning model using the training data to obtain a first trained machine learning model and a second trained machine learning model, the first trained machine learning model associated with the first person and the second trained machine learning model associated with the second person;
providing input data representing an image featuring the modified face of the first person to the first trained machine learning model to determine a point in a latent space of the first trained machine learning model that corresponds to the image featuring the modified face of the first person;
generating, using the second trained machine learning model based at least in part on the point in the latent space of the first trained machine learning model, output data representing a synthetic face of the second person; and
causing media content to be displayed on a display based at least in part on the output data, the media content having been generated by swapping the modified face of the first person featured in the image with the synthetic face of the second person.

12. The one or more non-transitory computer-readable media of claim 11, wherein the modifying is based at least in part on one or more offsets between the face of the first person and the face of the second person.

13. The one or more non-transitory computer-readable media of claim 11, wherein the modifying comprises at least one of:
adjusting a size or a shape of the face of the first person in the images;
adjusting a size, a shape, a position, or an orientation of a feature of the face of the first person in the images; or
adjusting a spacing between features of the face of the first person in the images.

14. The one or more non-transitory computer-readable media of claim 11, the operations further comprising:
generating, using a third trained machine learning model, a two-dimensional (2D) displacement mapping between the face of the first person and the face of the second person,
wherein the modifying is based at least in part on the 2D displacement mapping.

15. The one or more non-transitory computer-readable media of claim 11, the operations further comprising:
analyzing the source data to identify missing data;
generating, using a diffusion model, synthetic data that corresponds to the missing data; and
adding the synthetic data to the training data,
wherein the first machine learning model is trained against the second machine learning model using the training data that includes the synthetic data.

\* \* \* \* \*